United States Patent [19]

Kishimoto et al.

[11] Patent Number: 4,597,101

[45] Date of Patent: Jun. 24, 1986

[54] METHOD AND AN APPARATUS FOR CODING/DECODING TELEWRITING SIGNALS

[75] Inventors: Tomio Kishimoto; Yuichi Sato; Takahiko Kamae, all of Kanagawa, Japan

[73] Assignee: Nippon Telegraph & Telephone Public Corp., Tokyo, Japan

[21] Appl. No.: 508,900

[22] Filed: Jun. 28, 1983

[30] Foreign Application Priority Data

Jun. 30, 1982 [JP] Japan .................................. 57-113610

[51] Int. Cl.$^4$ ............................................. G06K 9/00
[52] U.S. Cl. ....................................... 382/13; 178/18; 382/3; 382/21; 382/59
[58] Field of Search ................... 382/13, 21, 3, 59, 60; 178/18, 19, 20; 364/900 MS File, 520, 521; 358/260, 261, 263; 250/203 R

[56] References Cited

U.S. PATENT DOCUMENTS

| | | | |
|---|---|---|---|
| 3,609,685 | 9/1971 | Deutsch | 382/21 |
| 3,982,165 | 9/1976 | Rich | 178/18 |
| 3,982,227 | 9/1976 | Joynson et al. | 382/21 |
| 4,005,400 | 1/1977 | Engdahl | 382/13 |
| 4,020,463 | 4/1977 | Himmel | 382/3 |
| 4,298,945 | 11/1981 | Kyte et al. | 364/521 |
| 4,317,109 | 2/1982 | Odaka et al. | 382/13 |

*Primary Examiner*—Leo H. Boudreau
*Assistant Examiner*—Joseph Mancuso
*Attorney, Agent, or Firm*—Roberts, Spiecens & Cohen

[57] ABSTRACT

A difference vector indicating movement of a pen between two adjacent sampled points is divided into macro movement and micro movement components. The macro and micro components are coded independently of each other so as to provide effective coding. In the case of coding the difference vector, the magnitude of the difference vector is coded in accordance with the types of zones (zone number k) and relative pel address within the zone. In order to improve the coding efficiency, a zone number difference is used instead of the zone number. Furthermore, the direction of the difference vector is expressed by a quadrant which includes this difference vector. In order to further improve the coding efficiency, a quadrant number difference is used instead of the quadrant number.

18 Claims, 28 Drawing Figures

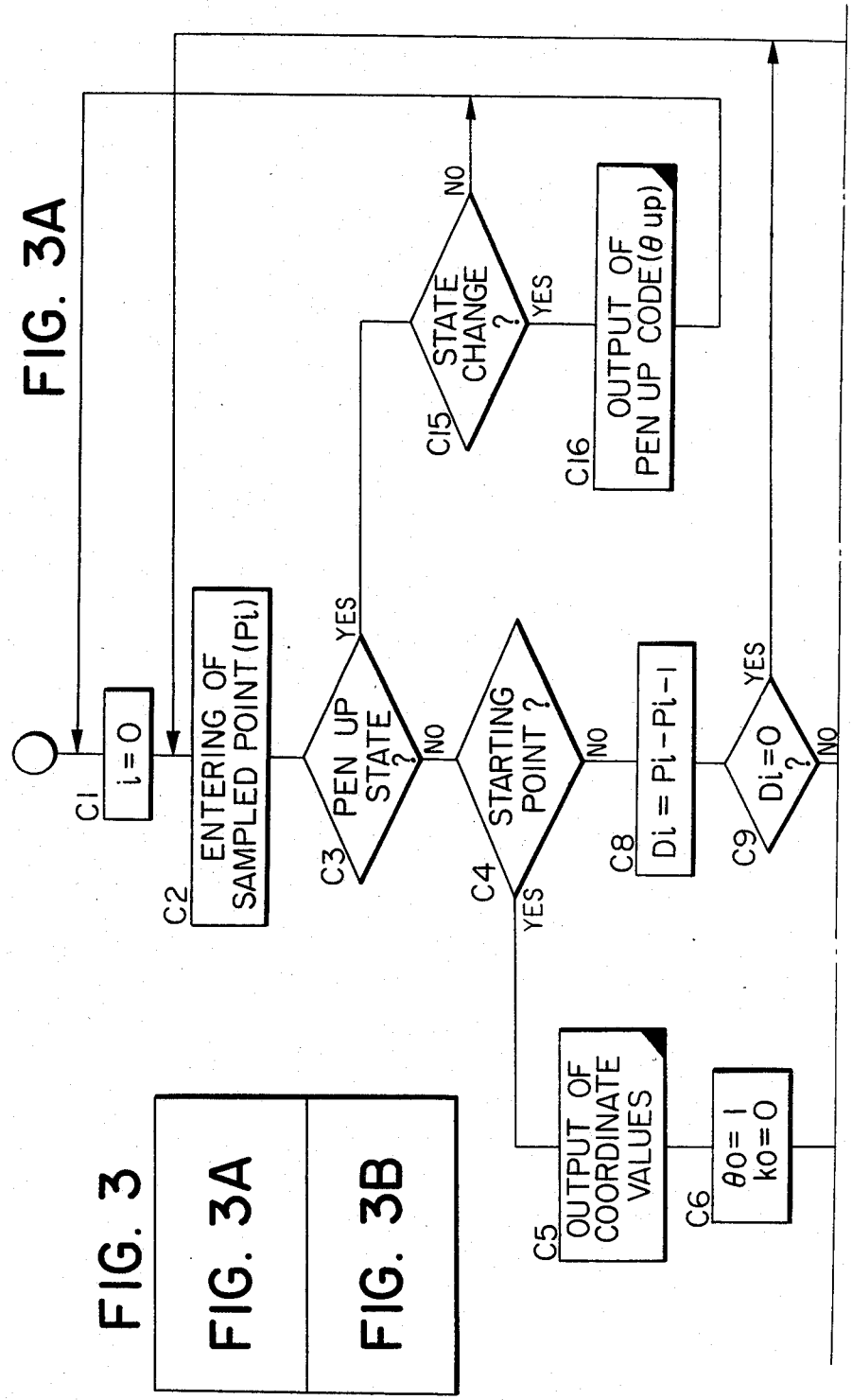

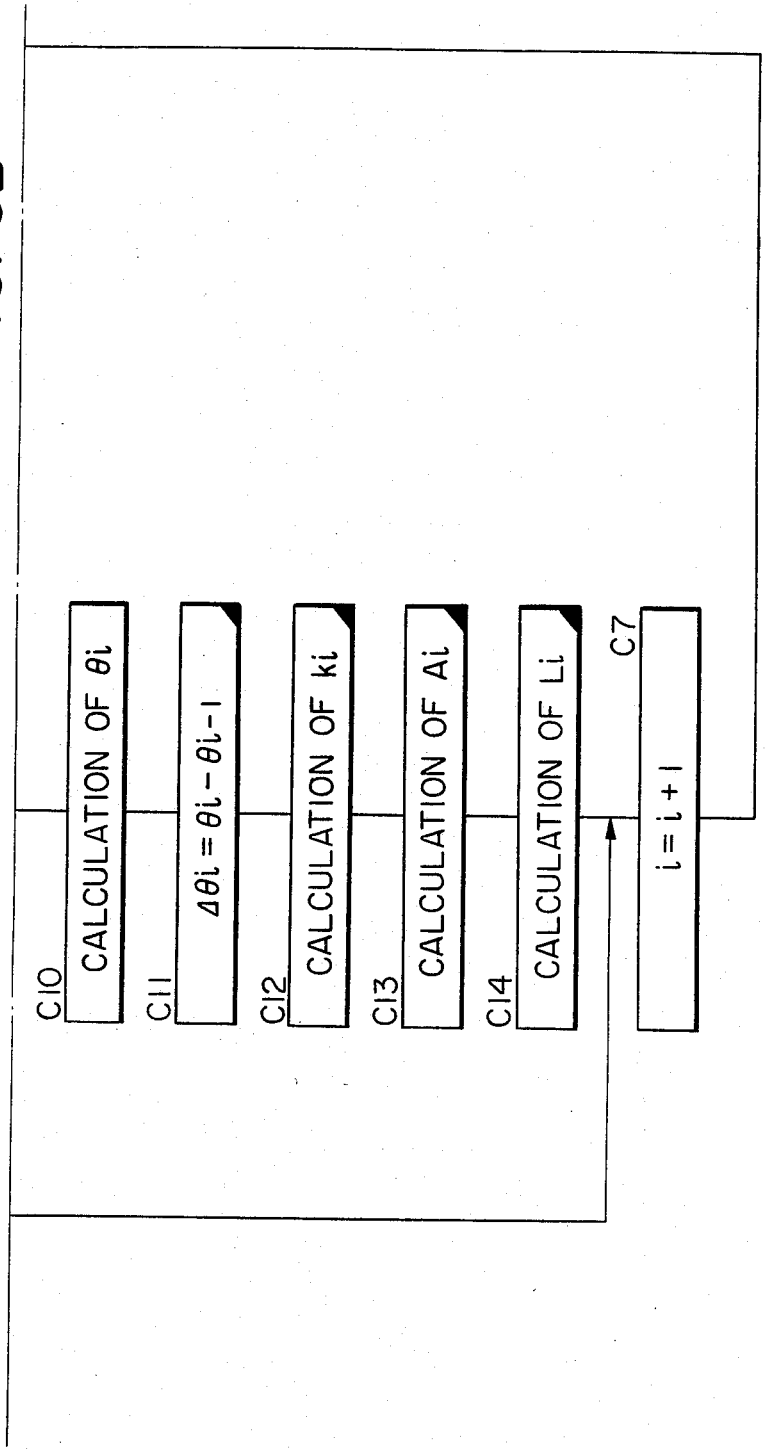

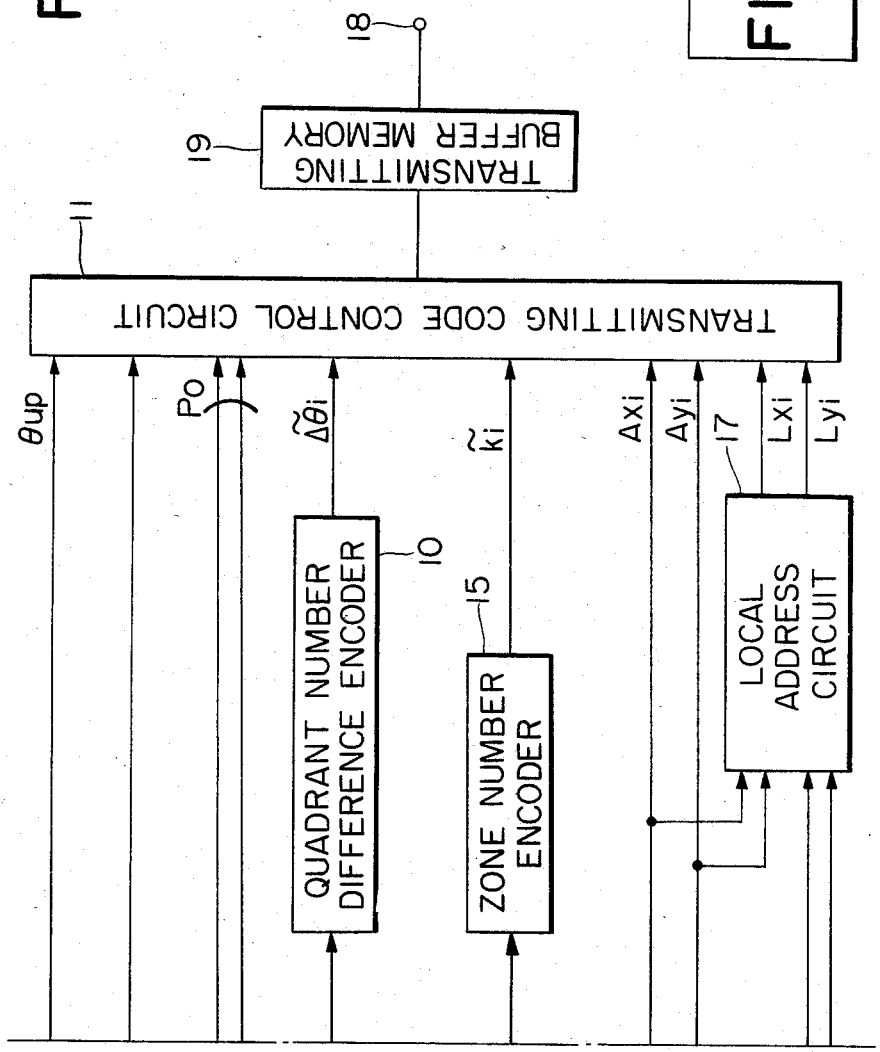

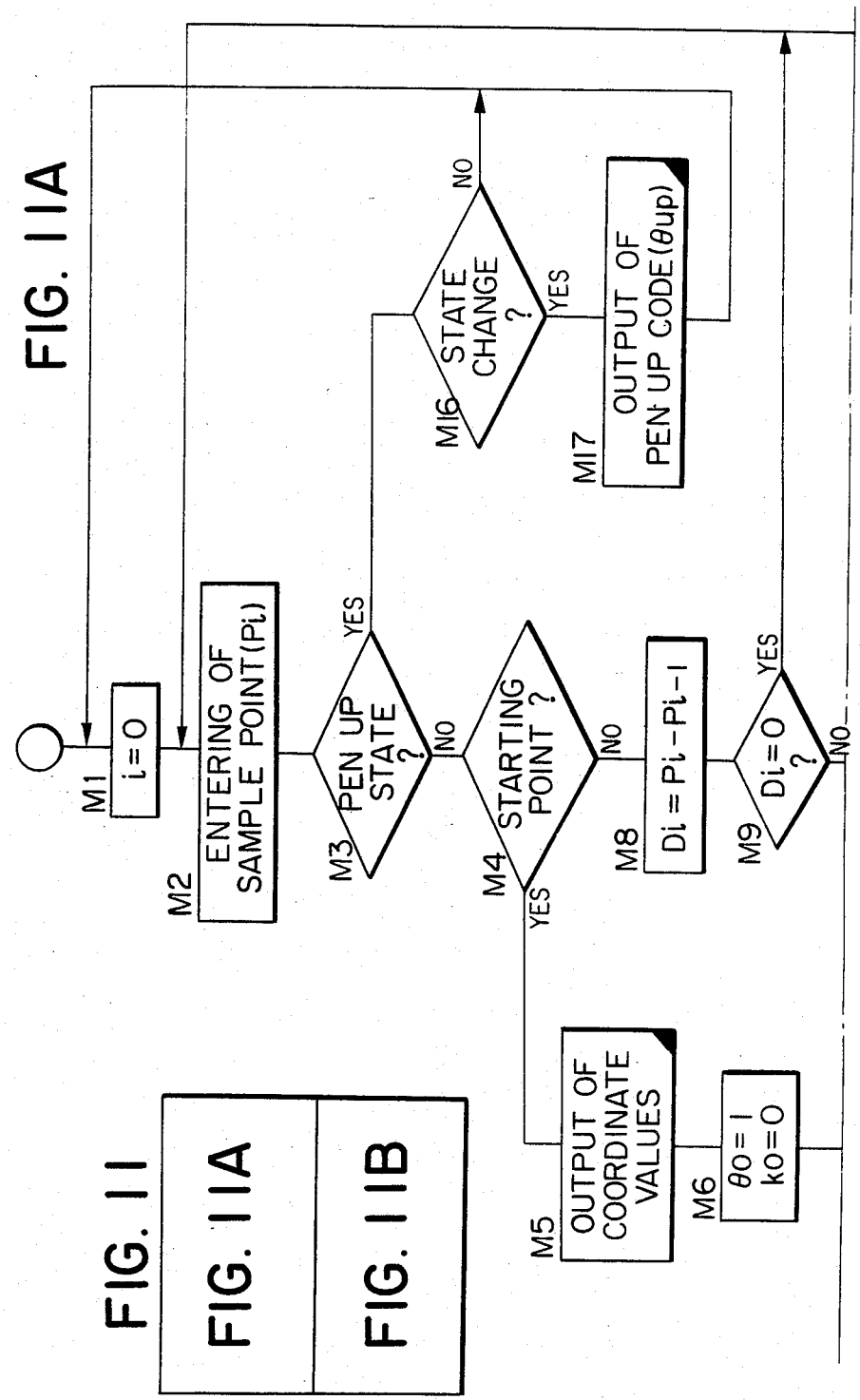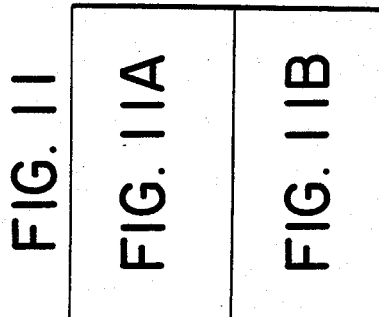

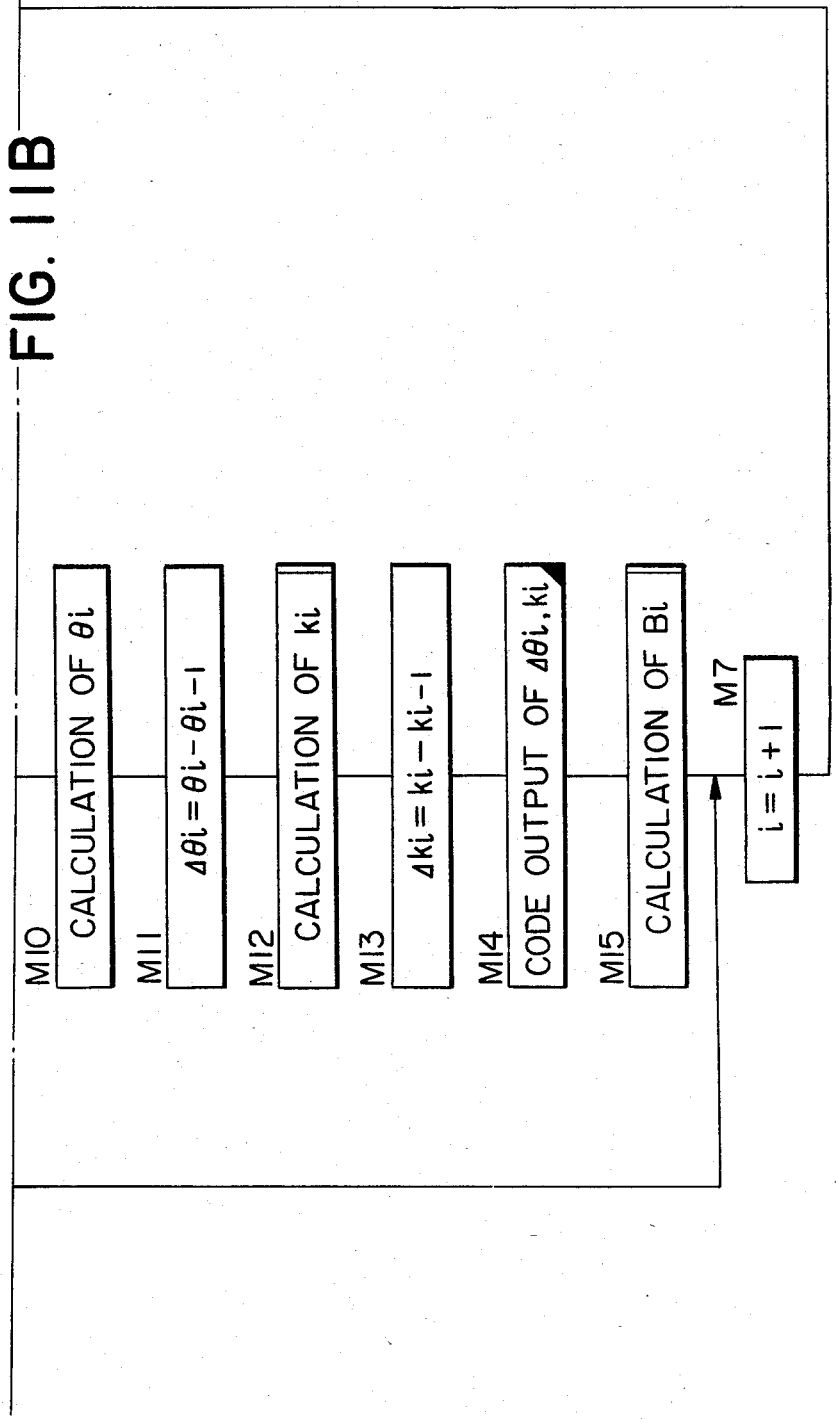

| FIG. 15A | FIG. 15B |

FIG. 16A
FIG. 16B
FIG. 16C
FIG. 16D
FIG. 16E

METHOD AND AN APPARATUS FOR CODING/DECODING TELEWRITING SIGNALS

BACKGROUND OF THE INVENTION

I. Field of the Invention

The present invention relates to a method and an apparatus for coding/decoding telewriting signals such as handwriting signals representing handwritten characters and graphics for transmission and display in a telewriting system.

II. Brief Description of the Prior Art

A communication system for simultaneously transmitting voice and handwritten information through an ordinary telephone channel is called a telewriting system. The bit rate allowed in transmitting handwriting signals must be maintained at about 300 bits/sec or less unless major degradation in voice quality is permissible. A coding method which enables handwriting signal transmission at a rate of 300 bits/sec or less is therefore essential to the telewriting system. The real-time handwriting signals to be transmitted must be sequentially processed by a coding algorithm. Furthermore, a simple, compact encoder must be used since it is built into a telewriting terminal.

Various coding techniques to store line drawing data have been proposed in the fields of picture processing, picture recognition, and computer graphics. Two coding methods suitable for the telewriting system have been conventionally known: (1) differential chain encoding (DCE) and (2) modified DPCM (MDPCM).

(1) DCE Method

In the DCE method, a change in direction of a drawn line is coded. A window comprising a 5×7 pel matrix is formed such that a pen position matches with the center of the matrix. The movement of the pen across any one of the peripheral 20 pels in the window is detected. An exponent corresponding to the direction of movement of the pen is determined by the pel position crossed by the pen. In a system wherein such exponents are sequentially obtained, a difference between two adjacent exponents is obtained and coded to a variable-length code, thereby encoding the change in direction of the drawn line.

The DCE method has a considerably high coding efficiency when the handwriting speed is slow. However, when the handwriting speed is increased, the coding efficiency is abruptly decreased. Furthermore, since part of the picture information is omitted by the window, the picture resolution is degraded accordingly.

(2) MDPCM Method

Unlike the DPCM method wherein coordinate differences $d_{xi}$ ($=x_i-x_{i-1}$) and $d_{yi}$ ($=y_i-y_{i-1}$) of pen positions sampled at predetermined time intervals are coded, the MDPCM encodes the differences $d_{xi}$ and $d_{yi}$ when the absolute values of the differences $d_{xi}$ and $d_{yi}$ are equal to or smaller than a predetermined value $d_{max}$ (i.e., $0<|d_{xi}|\leq d_{max}$ and $0<|d_{yi}|\leq d_{max}$), and encodes an absolute coordinate point (x, y) when the absolute values of the differences $d_{xi}$ and $d_{yi}$ are greater than the predetermined value $d_{max}$ (i.e., $|d_{xi}|>d_{max}$ or $|d_{yi}|>d_{max}$). The MDPCM method has a high coding efficiency when the handwriting speed is low. However, when the handwriting speed is increased, the coding efficiency is decreased with an increase in the amount of data to be processed. Furthermore, a high-resolution image cannot be effectively encoded at a high coding efficiency.

As may be apparent from the above description, depending on the types of telewriting signals, the conventional coding method may not satisfy the condition wherein a voice signal and a handwriting signal are simultaneously transmitted at a bit rate of 300 bits/sec or less. Therefore, the bit rate must be further decreased.

SUMMARY OF THE INVENTION

It is an object of the present invention to provide a method and an apparatus for efficiently coding/decoding handwritten information.

In order to achieve the above object of the present invention, there is provided a method for coding a difference (to be referred to as a difference vector signal or simply a difference vector hereinafter) by inputting a series of coordinate signals indicating a handwritten image and by calculating the difference vector signal between two adjacent coordinate signals, comprising the steps of dividing a change in the difference vector into a micro component and a macro component, and independently coding the micro and macro components, thereby providing an effective coding method.

According to the coding method of the present invention, when the difference vectors are expressed in X-Y coordinate points, a plurality of difference vector groups (i.e., zones) are preset such that areas of the zones increase as the X-Y coordinate points are spaced further apart from the origin of the X-Y coordinate system. The macro component of the difference vector is determined by a given zone to which this difference vector belongs. The micro component of the difference vector is determined by a relative pel address in the given zone. The given zone and the corresponding relative pel address are coded.

According to an embodiment of the present invention, the zones are respectively designated by zone numbers sequentially assigned thereto. A given pel position relative to another pel position within the same zone is designated by an intrazone address (i.e., area address) assigned to each of areas into which the zone is equally divided and by a local address assigned to each of the plurality of coordinate positions within each area. The zone number, the area address and the local address are coded independently of each other.

According to another embodiment of the present invention, the zones are respectively designated by zone numbers sequentially assigned thereto. A pel position relative to another pel position within the same zone is designated by an address (relative pel address) among addresses indicating a plurality of coordinate positions within the zone. A zone number difference is coded as the information discriminating the zone, and a relative pel address within the zone is coded as the given pel position relative to another pel position.

In order to perform more effective coding, a change in direction of the difference vector is separated: a sign component of the difference vector is separated from the length compoment thereof so as to obtain from the sign a quadrant to which the difference vector belongs. A number is assigned to each quadrant, and a difference between successive difference vectors, that is, a quadrant number difference, is obtained and coded. In this case, the zone is positioned in a single quadrant (e.g., the first quadrant) to be called an absolute value zone. Every zone in all the quadrants can be designated by a combination of the given zone and the absolute value zone.

The above and other objects, features and advantages of the present invention will become more apparent from the following description of preferred embodiments thereof taken in conjunction with the accompanying drawings.

BRIEF DESCRIPTION OF THE DRAWINGS

FIGS. 3, 3a and 3b comprise a flow chart for explaining a coding algorithm of a first embodiment of the present invention;

FIGS. 8, 8a and 8b comprise a block diagram of a coding apparatus of the first embodiment of the present invention;

FIGS. 11, 11a and 11b comprise a flow chart for explaining a coding algorithm of a second embodiment of the present invention;

FIGS. 16A to 16E show handwritten information for testing the coding efficiency of the present invention, respectively.

DESCRIPTION OF THE PREFERRED EMBODIMENTS

First Embodiment

Figure 1:
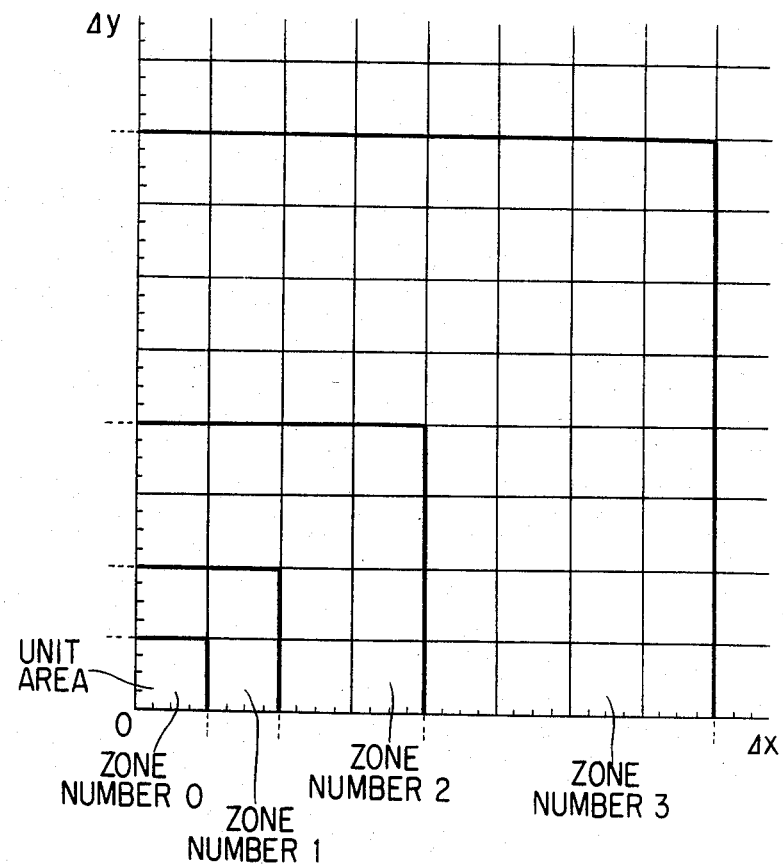
FIG. 1 is a representation of zone division and zone designation number in the difference vector space.

In general, characters and graphics are entered using a graphic input device such as a pressure sensitive tablet or a digitizer. Coordinate signals from the graphic input device are sampled at predetermined time intervals, thereby obtaining the following sampled points:

$$P_0, P_1, P_2, \ldots P_f$$

Here assume that each sampled point $P_i$ is expressed using the X-Y coordinates as follows:

$$P_i = P_i(x_i, y_i) \quad (1)$$
$$\text{for } i = 0, 1, 2, \ldots, f$$

where $P_0$ is the starting point and $P_f$ is the end point. A difference vector $D_i(\Delta x_i, \Delta y_i)$ is given from the sampled point $P_i$ as follows:

$$\begin{cases} \Delta x_i = x_i - x_{i-1} \\ \Delta y_i = y_i - y_{i-1} \end{cases} \quad (2)$$
$$\text{for } i = 1, 2, \ldots, f$$

However, the difference vector $D_i(0, 0)$ is excluded.

A quadrant $\theta_i$ which contains the i-th difference vector is obtained. The quadrant $\theta_i$ is defined on the basis of the signs of the differences or components $\Delta x_i$ and $\Delta y_i$.

TABLE 1

| $\Delta x_i$ | $\Delta y_i$ | $\theta_i$ |
| --- | --- | --- |
| $\Delta x_i \geq 0$ | $\Delta y_i \geq 0$ | 1 |
| $\Delta x_i < 0$ | $\Delta y_i \geq 0$ | 2 |
| $\Delta x_i < 0$ | $\Delta y_i < 0$ | 3 |
| $\Delta x_i \geq 0$ | $\Delta y_i < 0$ | 4 |

A quadrant number difference $\Delta \theta_i$ is obtained from the quadrant $\theta_i$ of the obtained difference vectors, as follows:

$$\Delta \theta_i \equiv \theta_i - \theta_{i-1} \pmod 4 \quad (3)$$
$$\text{for } i = 1, 2, \ldots, f$$

where "$\equiv$" is the congruence sign in mod 4. The quadrant $\theta_0$ is defined as 1 for illustrative convenience. Therefore, the quadrant number difference $\Delta \theta_i$ is one of the values 0, 1, 3 and 2. The difference vector can be regarded as the vector in the first quadrant since the quadrant number difference is used.

The zone number will be described hereinafter. The first quadrant is divided into a plurality of zones in accordance with the distance from the origin, as shown in FIG. 1. Each zone is divided into smaller areas (to be referred to as unit areas hereinafter) each having a predetermined size. Each unit area comprises a 4×4 pel matrix.

The zone width increases as a distance between the origin and the zone increases. A remote zone has a greater number of unit areas. The zones are numbered in the order of 0, 1, 2, ..., k, .... The zone numbered as k is called Z(k). The width of the zone Z(k) along the x direction is given as $2^{k-1}$ (for $k \neq 0$). Furthermore, the x addresses (distances from the origin) of the rightmost and leftmost pel are $4 \times 2^k - 1$ and $4 \times 2^{k-1}$.

The number N(Z(k)) of unit areas included in the zone Z(k) is given as follows:

$$N(Z(k)) = 3 \times (2^{k-1})^2 \quad (4)$$

The difference vector space is divided in accordance with the quadrant number differences, the zones, and the unit areas. Therefore, any difference vector $D_i$ is expressed by four fields: $\Delta \theta_i$, $k_i$, $A_i$, and $L_i$ (where $\Delta \theta_i$ is the quadrant number difference, $k_i$ is the zone number, $A_i$ is the unit area number or the area address within a given zone, and $L_i$ is the pel address (local address) within the unit area.

The quadrant number difference $\Delta\theta_i$, the zone number $k_i$, the area address $A_i$ and the local address $L_i$ may be obtained from the difference vector $D_i$ given by equation (2) in the following manner. The quadrant number difference $\Delta\theta_i$ is obtained from equation (3). The zone number $k_i$ is determined by the following equation:

$$k_i = [\log_2([K/h] + 1)] \quad (8)$$

where h is the length of the side of the unit area and K is given as follows:

$$K = \max(|\Delta x_i|, |\Delta y_i|) \quad (6)$$

where [a] is the largest Gaussian integer which does not exceed a, and [a] is the smallest integer which is equal to or greater than a.

The area address $A_i$ is obtained by counting the number of unit areas along the x and y directions as follows:

$$A_i = (Ax_i, Ay_i) \quad (7)$$

The addresses $Ax_i$ and $Ay_i$ of the coordinate point $(Ax_i, Ay_i)$ of the area address $A_i$ are given as follows:

$$\begin{cases} Ax_i = [|\Delta x_i|/h] \\ Ay_i = [|\Delta y_i|/h] \end{cases} \quad (8)$$

where [] is the same Gaussian integer notation as used in equation (5).

The local address $L_i$ is expressed by the addresses of the pel position along the x and y directions within the unit area as follows:

$$L_i = (LX_i, LY_i) \quad (9)$$

The pel position local addresses $Lx_i$ and $Ly_i$ are given as follows:

$$\begin{cases} Lx_i = |\Delta x_i| - Ax_i \times h \\ Ly_i = |\Delta y_i| - Ay_i \times h \end{cases} \quad (10)$$

When the difference vector $D_i$ is determined as described above, the quadrant number difference $\Delta\theta_i$, the zone number $k_i$, the area address $A_i$ and the local address $L_i$ are obtained from equations (3), (5), (8) and (10), respectively.

On the other hand, if the quadrant number difference $\Delta\theta_i$, the zone number $k_i$, the area address $A_i$ and the local address $L_i$ are given, the difference vector $D_i$ can be readily obtained (i.e., decoding can be performed) from equation (10) as follows:

$$\begin{cases} |\Delta x_i| = Lx_i + Ax_i \times h \\ |\Delta y_i| = Ly_i + Ay_i \times h \end{cases} \quad (11)$$

Furthermore, the quadrant $\theta_i$ of the difference vector $D_i$ can be obtained from the quadrant number difference $\Delta\theta_i$. That is, according to equation (3), $$\theta_i = \Delta\theta_i + \theta_{i-1} \pmod 4 \quad (12)$$

The signs of the components $\Delta x_i$ and $\Delta y_i$ can be determined in accordance with the quadrant $\theta_i$.

In this manner, the values $\{(\Delta\theta_i, k_i, A_i, L_i)\}$ can be obtained from the difference vector $D_i$, and vice versa.

Figure 2:
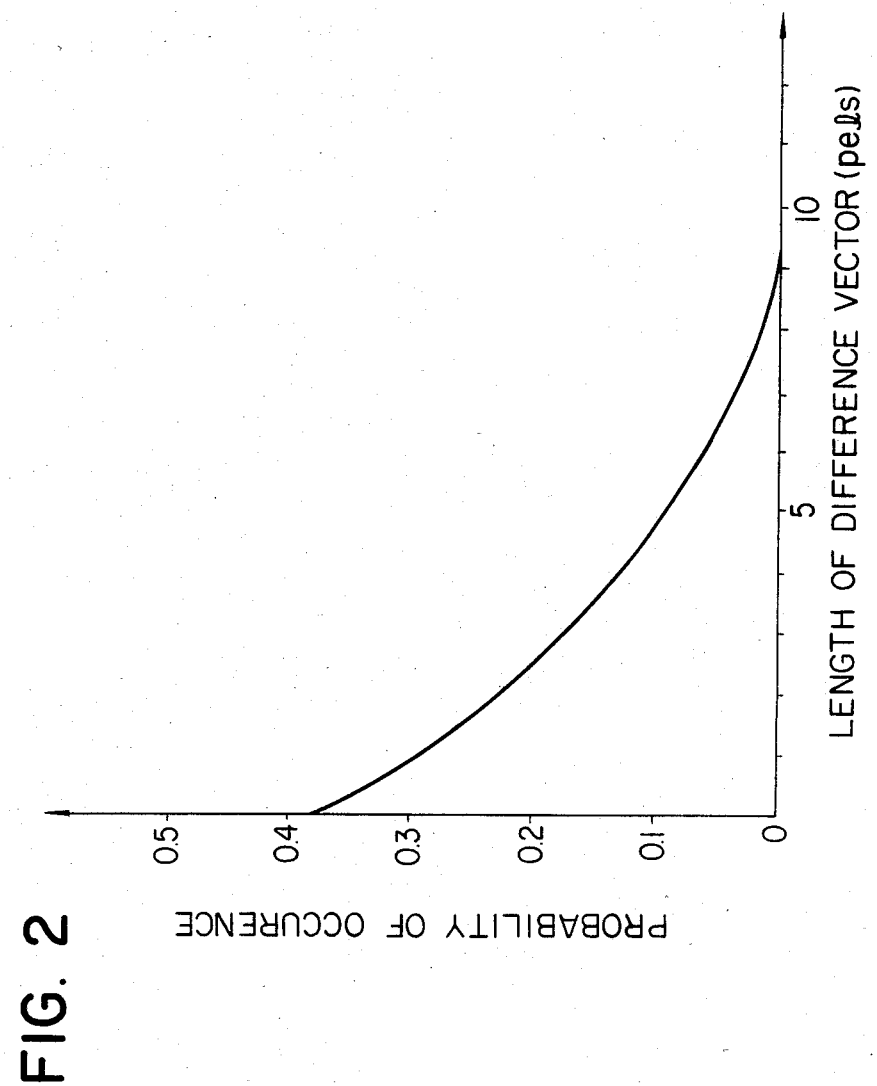
FIG. 2 is a graph for explaining the probability of occurrence as a function of the length of the difference vector as a distribution example of coordinate differences of sampled points.

The codes assigned to the quadrant number difference $\Delta\theta_i$, the zone number $k_i$, the area address $A_i$ and the local address $L_i$ will be described. The quadrant number difference $\Delta\theta_i$ has four states designated by 0, 1, 3 and 2. Huffman coding is performed in accordance with the probability of occurrence of the vectors to assign the optimum length code to the quadrant number difference $\Delta\theta_i$. The results are shown in FIG. 2. When the operator draws a figure, the direction of a curve does not greatly change. Therefore, then the quadrant number difference is decreased, a change in direction of the curve is small. Therefore, a variable-length code is assigned such that a short-length code is assigned to a quadrant number difference having a high probability, whereas a long-length code is assigned to a quadrant number difference having a low probability.

TABLE 2

| Code Allocation of Quadrant Number Difference $\Delta\theta_i$ | |
|---|---|
| State | Code |
| 0 | 0 |
| 1 | 10 |
| 3 | 110 |
| 2 | 111 |

Therefore, the overall number of bits required for codes can be decreased.

Table 3 shows the code allocation for the zone number $k_i$.

TABLE 3

| Code Allocation for Zone Number $k_i$ | |
|---|---|
| Zone number | Code |
| 0 | 0 |
| 1 | 10 |
| 2 | 110 |
| 3 | 1110 |
| 4 | 11110 |
| 5 | 111110 |
| . | . |
| . | . |
| . | . |

According to Table 3, a longer code is assigned to a larger zone number. When the zone number is large, the length of the difference vector is great. Then, the probability of occurrence of such a difference vectors is abruptly decreased as shown in FIG. 2. As a result, the number of bits is decreased in accordance with the code allocation shown in Table 3.

Table 4 shows the code allocation for the area address $A_i$.

TABLE 4

| Code Allocation for Area Address $A_i$ | |
|---|---|
| $Ax_i$ or $Ay_i$ | Code |
| 0 | 0 . . . 0000 |
| 1 | 0 . . . 0001 |
| 2 | 0 . . . 0010 |
| 3 | 0 . . . 0011 |
| 4 | 0 . . . 0100 |
| 5 | 0 . . . 0101 |
| 6 | 0 . . . 0110 |
| . | . |
| . | . |
| . | . |

The codes in Table 4 differ in accordance with the zone numbers and have a Z-bit fixed length. The code of each of the x and y local addresses Lx and Ly of the zone number 2 has a fixed two-bit length. The code of each of the x and y local addresses Lx and Ly of the zone number 3 has a fixed three-bit length. It should be noted that no area address code is assigned when Z=0.

Similarly, a small-bit length code is assigned to the area address $A_i$ when the zone number is small. Therefore, when the difference vector has a high probability of occurrence, its bit length is short. Therefore, the overall coding bit length can be decreased.

Figure 5:
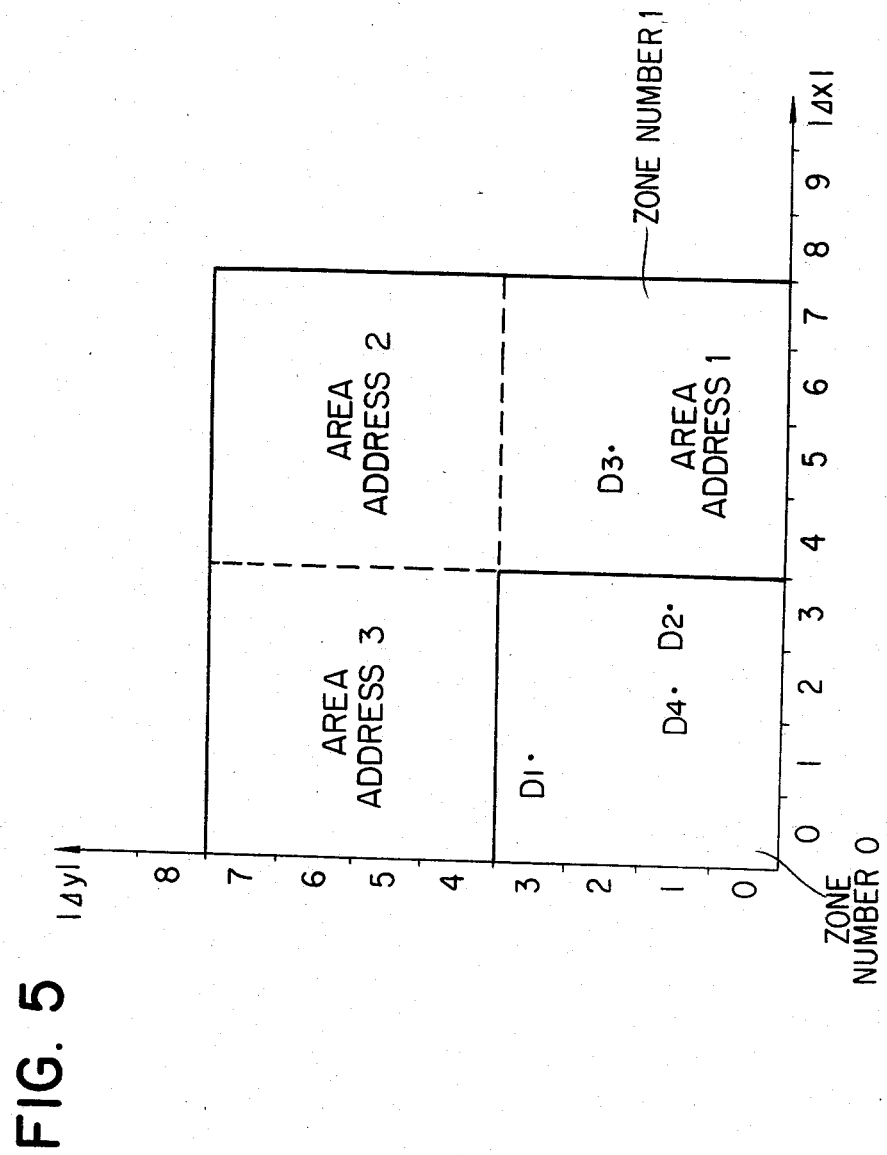
FIG. 5 is a graph for explaining zones which contain the difference vectors $D_1$ to $D_4$ (FIG. 4), and their coordinate points.

FIG. 5 shows the code allocation for the local address $L_i$.

TABLE 5

| Code Allocation for Local Address $L_i$ | |
|---|---|
| $Lx_i$ or $Ly_i$ | Code |
| 0 | 0 ... 0000 |
| 1 | 0 ... 0001 |
| 2 | 0 ... 0010 |
| 3 | 0 ... 0011 |
| 4 | 0 ... 0101 |
| . | . |
| . | . |
| . | . |

These codes differ in accordance with the size of the unit areas and have a fixed bit length $[\log_2 h]$ when one side of the unit area is given as h.

The area address $A_i$ and the local address $L_i$ are expressed in binary notation by coordinate points respectively within the zone and the unit area. However, Huffman coding may be utilized for optimization, depending on the probability of occrrence of the difference vectors.

The starting point at the time of "pen down" an the code for "pen up" will be described. The starting point can be expressed by an absolute coordinate point having a bit length long enough to express the maximum value within the coordinate plane. An extra code indicating that a pen has just been up is added to only a final vector $D_f$. However, here a special code is not added to indicate the pen up state: the difference vector can be used since it does not trasnmit data of "0". More particularly, the pen up state can be detected under the conditions that the quadrant number difference $\Delta\theta_i = 0$, the zone number $k_i = 0$, the local x address $Lx = 0$ and the local y address $Ly = 0$. The above procedures are shown by a flow chart in FIG. 3.

Figure 4:
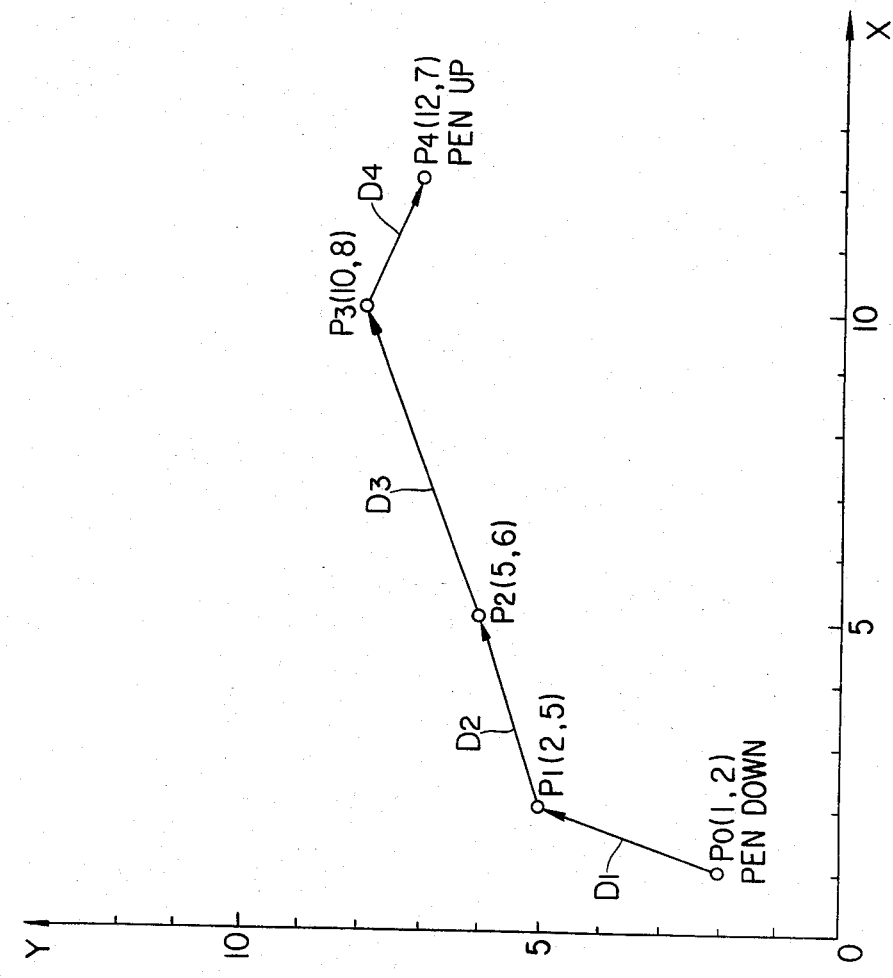
FIG. 4 is a graph for explaining line drawing according to the present invention.

FIG. 5 is a graph showing the zones which contain the difference vectors $D_1$ to $D_4$ in FIG. 4, and the positions of the difference vectors $D_1$ to $D_4$ in the corresponding zones. The components of the stroke drawn in FIG. 4 are given in Table 6.

TABLE 6

| Sampled Point $P_i$ | $P_1$ (2, 5) | $P_2$ (5, 6) | $P_3$ (10, 8) | $P_4$ (12, 7) |
|---|---|---|---|---|
| Difference vector $D_i$ | $D_1$ (1, 3) | $D_2$ (3, 1) | $D_3$ (5, 2) | $D_4$ (2, −1) |
| Quadrant $\theta_i$ | 1 | 1 | 1 | 3 |
| Quadrant No. difference $\Delta\theta_i$ | $\Delta\theta_1$ 0 | $\Delta\theta_2$ 0 | $\Delta\theta_3$ 0 | $\Delta\theta_4$ −2 |
| Zone (Z) No. $k_i$ | $k_1$ 0 | $k_2$ 0 | $k_3$ 1 | $k_4$ 0 |
| Area address $A_i$ | none | none | 1 | none |
| Local address | ($Lx_1$, $Ly_1$) | ($Lx_2$, $Ly_2$) | ($Lx_3$, $Ly_3$) | ($Lx_4$, $Ly_4$) |

TABLE 6-continued

| $L_i$ | (1, 3) | (3, 1) | (1, 2) | (2, 1) |
|---|---|---|---|---|

These components are coded in accordance with the code allocations (FIGS. 2 to 5), as will be shown in Table 7.

TABLE 7

| $P_o$ | |
|---|---|
| $x_o$ 000001 | $y_o$ 000010 |

| $D_1$ | | | |
|---|---|---|---|
| $\Delta\theta_1$ 0 | $k_1$ 0 | $Lx_1$ 01 | $Ly_1$ 11 |

| $D_2$ | | | |
|---|---|---|---|
| $\Delta\theta_2$ 0 | $k_2$ 0 | $Lx_2$ 11 | $Ly_2$ 01 |

| $D_3$ | | | | | |
|---|---|---|---|---|---|
| $\Delta\theta_3$ 0 | $k_3$ 10 | $Ax_3 Ay_3$ 1  0 | | $Lx_3$ 01 | $Ly_3$ 10 |

| $D_4$ | | | |
|---|---|---|---|
| $\Delta\theta_4$ 110 | $k_4$ 0 | $Lx_1$ 10 | $Ly_4$ 01 |

| Pen Up | | | | | |
|---|---|---|---|---|---|
| 0 | 0 | 0 | 0 | 0 | 0 |

It should be noted that the coordinate space comprises a 64 ($2^6$)×64 ($2^6$) pel matrix, and that the unit area comprises a 4×4 pel matrix.

Figure 6:
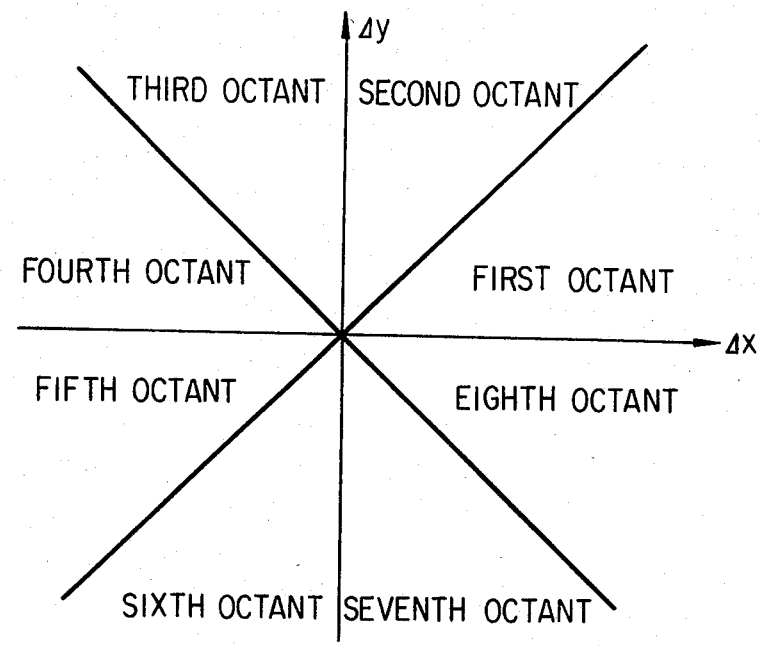
FIG. 6 is a representation showing octants when the X-Y coordinate plane is divided by four lines $y=0$, $x=0$, $y=x$ and $y=-x$.

In the above-mentioned description, the coordinate system has four quadrants. However, as shown in FIG. 6, the coordinate system may have octants. In this case, a vector can be expressed as a vector in a single octant.

Figure 7:
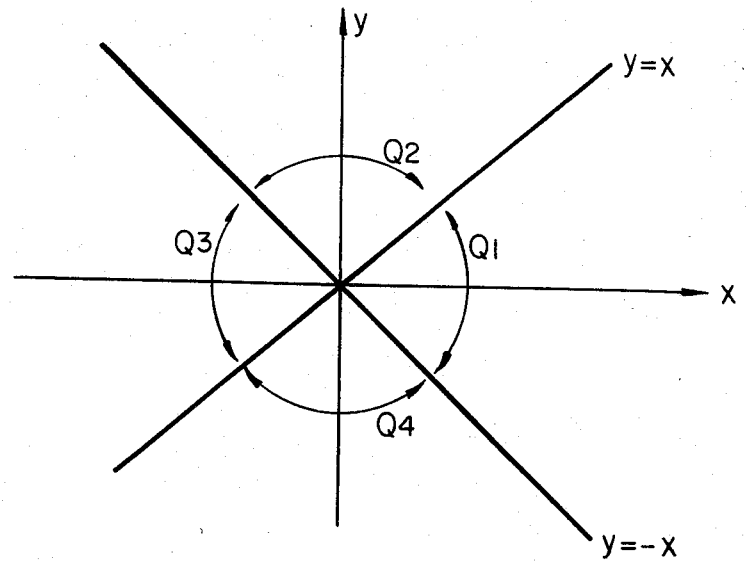
FIG. 7 is a representation showing four quadrants when the X-Y coordinate plane is divided by two lines $y=x$ and $y=-x$.

Alternatively, as shown in FIG. 7, the X-Y coordinates may be divided as follows, in place of the division based only on the difference vector sign. More particularly, the four quadrants $\theta_1$, $\theta_2$, $\theta_3$ and $\theta_4$ are given as follows:

$\theta_1 = \{(x, y); y \leq x \text{ and } y > -x\}$ $\theta_2 = \{(x, y); y > x \text{ and } y \geq -x\}$ $\theta_3 = \{(x, y); y \geq x \text{ and } y < -x\}$ $\theta_4 = \{(x, y); y < x \text{ and } y \leq -x\}$ The above division of the X-Y coordinates is very effective when the operator tends to draw mostly horizontal or vertical lines.

Figure 8A:
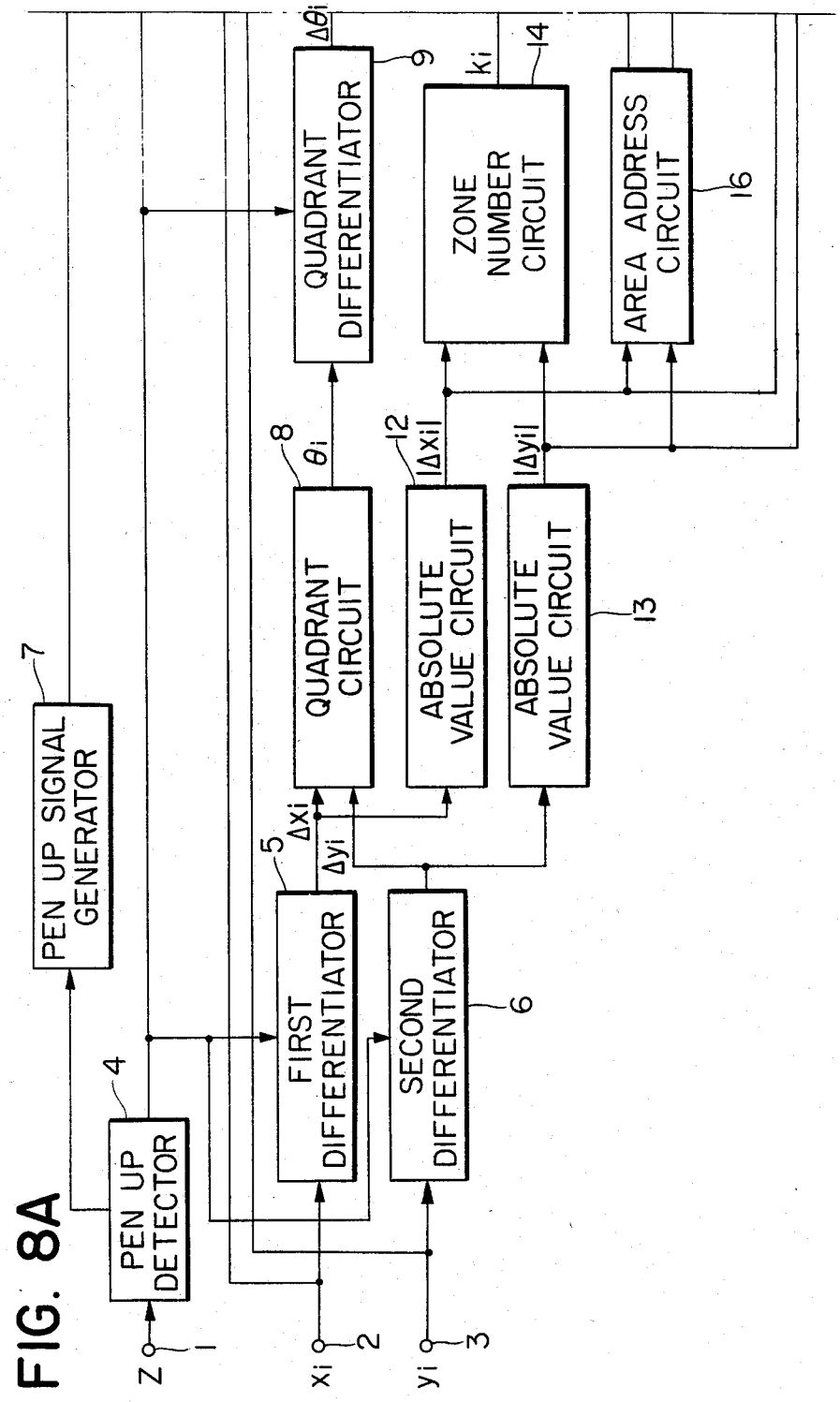

A coding apparatus for performing the coding described above will be described with reference to a block diagram thereof shown in FIG. 8.

Figure 9:
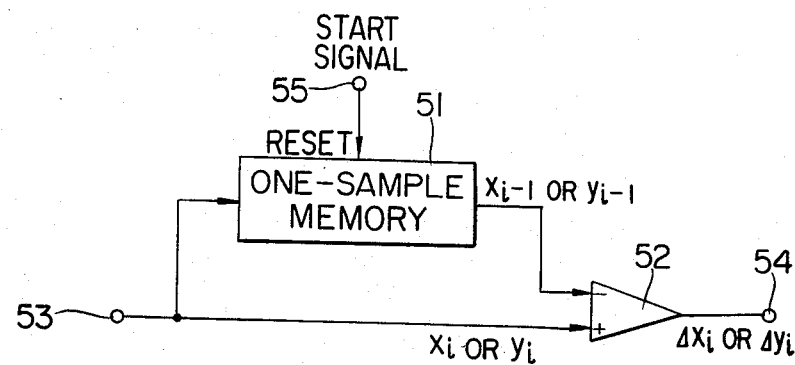
FIG. 9 is a block diagram of a differentiator of the apparatus shown in FIG. 8.

The coordinate signal consists of a sampled point $(x_i, y_i)$ and a flag Z indicating the pen up or pen down state. The coordinate signal is respectively supplied from inputs 1, 2 and 3 to a pen up detector 4 and first and second differentiators 5 and 6. When the flag Z is set to indicate the pen up state, the pen up detector 4 produces a stop signal so as to reset the first and second differentiators 5 and 6. In response to the stop signal, a pen up signal generator 7 generates a code $\theta_{up}$ corresponding to the pen up state and supplies it to a transmitting code control circuit 11. When the flag Z indicates that the pen up state is switched to the pen down state, the first and second differentiators 5 and 6 perform subtraction such that the first coordinate signal which indicates the sampled point $(x_0, y_0)$ as the initial value and the second coordinate signal which indicates the sampled point $(x_1, y_1)$ are used to calculate differences $\Delta x_0 = x_1 - x_0$ and $\Delta y_0 = y_1 - y_0$, respectively. Similarly, the first and second differentiators 5 and 6 sequentially calculate differences $\Delta x_i = x_i - x_{i-1}$ and $\Delta y_i = y_i - y_{i-1}$ using the sampled points $(x_i, y_i)$ and $(x_{i-1}, y_{i-1})$ supplied from the inputs 2 and 3. FIG. 9 shows a differentiator used as the first or second differentiator 5 or 6. This differentiator comprises a one-sample memory 51 and a subtractor 52. The coordinate signal is supplied to an input 53, and differences $\Delta x_i$ and $\Delta y_i$ appear at an output 54. The one-sample memory 51 is reset by the stop signal supplied to an input 55.

Figure 10:
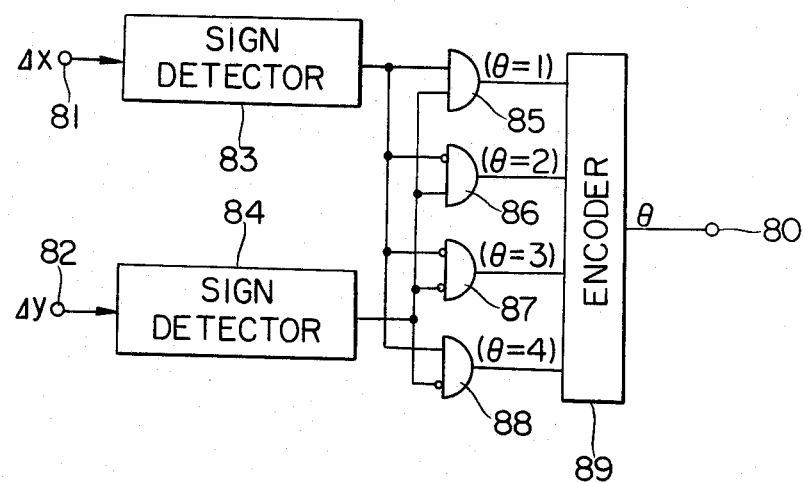
FIG. 10 is a block diagram of a quadrant circuit of the apparatus shown in FIG. 8.

A quadrant circuit 8 determines the quadrants $\theta_i$ of the difference vectors $D_i = (\Delta x_i, \Delta y_i)$ respectively from the differentiators 5 and 6 in accordance with the signs of the differences $\Delta x_i$ and $\Delta y_i$. FIG. 10 shows a detailed arrangement of the quadrant circuit 8. The quadrant circuit 8 comprises: sign detectors 83 and 84 which generate signals of logic level "1" when inputs 81 and 82, respectively, receive a positive or zero signal, and which generate signals of logic level "0" when the inputs 81 and 82, respectively, receive a negative signal; logic circuits 85 to 88 connected to outputs of the sign detectors 83 and 84 so as to determine the quadrants of the difference vectors; and an encoder 89 for coding the determination results to produce a quadrant signal $\theta$ from its output 80.

A quadrant differentiator 9 calculates the quadrant number difference $\Delta\theta_i$ by an operation $\theta_i - \theta_{i-1}$ (mod 4). An output signal from the quadrant differentiator 9 is coded by a quadrant number difference encoder 10 so as to have a variable code length. The variable-length code is then supplied to a transmitting buffer memory 19 through the transmitting code control circuit 11.

Absolute value circuits 12 and 13 calculate absolute values $|\Delta x_i|$ and $|\Delta y_i|$ of the components $\Delta x_i$ and $\Delta y_i$ of the difference vector $D_i$, respectively. These values are supplied to a zone number circuit 14.

The zone circuit 14 compares the absolute values $|\Delta x_i|$ and $|\Delta y_i|$ of a no-sign difference vector $(|\Delta x_i|, |\Delta y_i|)$ and selects the larger value. This larger value is used as the value K so as to calculate the zone number $k_i$ from the following equation:

$$[\log_2([K/h]+1)] = k_i \tag{13}$$

The zone number $k_i$ is coded by a zone number encoder 15 so as to have a variable code length. This variable-length code indicating the zone number $k_i$ is then supplied to the transmitting code control circuit 11.

An area address circuit 16 calculates the area addresses $Ax_i$ and $Ay_i$ from the no-sign difference vector $(|\Delta x_i|, |\Delta y_i|)$ in accordance with operations $[|\Delta x_i|/h]$ and $[|\Delta y_i|/h]$. The area addresses $Ax_i$ and $Ay_i$ are supplied to a local address circuit 17 and the transmitting code control circuit 11.

The local address circuit 17 performs the operations $|\Delta x_i| - Ax_i \times h$ and $|\Delta y_i| - Ay_i \times h$. The calculation results are supplied to the transmitting code control circuit 11.

The transitting code control circuit 11 receives the pen up/down signal, the starting point signal, the quadrant number difference signal, the zone number signal, the area address signal, and the local address signal and transmits the resulting signal in the transmitting code format to the transmitting buffer memory 19. When the above-mentioned coding is performed, the coordinate signal can be transmitted using a short code. These coding procedures are repeated every time a coordinate signal corresponding to the sampled point of the line drawing is entered. However, several sampled points may be coded in units of strokes.

The transmitted code can be decoded in a reverse manner with respect to the coding process so as to obtain the original coordinate signal.

As described above, the coding/decoding apparatus is not limited to the arrangement in the above embodiment. For example, a microprocessor may be used to perform coding/decoding in a software manner.

A small change in direction of the difference vectors causes a high probability of the occurrence thereof. A small magnitude of the difference vector causes a high probability of the occurrence thereof. Therefore, as has been described in the present invention, when the direction of the difference vector is coded by the quadrant number difference and the magnitude of the difference vector is coded by the zones, and when these components are coded independently of each other, a short code can be assigned to each vector having a high probability of occurrence. As a result, highly efficient coding using a small number of bits can be performed. Furthermore, since each zone is divided into a corresponding number of unit areas, a small change in a difference vector is detected as a change in position thereof within the unit area, thereby providing highly precise position detection.

Furthermore, according to the present invention, the code allocation of the zone number and the area address expression are independent of the coordinate space. As a result, coding can be performed independently of the resolution and size of the input device. In addition to this advantage, since an input system and an output system which have different resolutions can be used to detect only the size of the unit area, proper coding/decoding can be performed. Therefore, a coding system may be designed without considering the specifications of the physical devices of the actual input and output systems, resulting in convenience.

SECOND EMBODIMENT

Unlike the first embodiment wherein the zone number is coded to form a variable-length code, a zone number difference is coded to form a variable-length code in the second embodiment so as to further improve the coding efficiency.

FIG. 11 is a flow chart for explaining the steps of executing the coding procedures of the second embodiment. The steps M1 to M11 for obtaining the quadrant number difference $\Delta\theta_i$ in the second embodiment are substantially the same as the steps C1 to C11 of the first embodiment.

Let i be zero in step M1. A sampled point $P_i$ is entered in step M2. It is determined in step M3 whether or not the pen has just been up. If NO in step M3, it is then determined in step M4 whether or not the sampled point $P_i$ is the starting point. If YES in step M4 (i.e., i=0), the coordinate values of the sampled point $P_0$ are produced as the code in step M5. In step M6, let $\theta_0$ and $k_0$ be 1 and 1, respectively. In step M7, let i be i+1. Thereafter, the flow returns to step M2. In step M2, the next sampled point $P_i$ is entered.

However, if NO in step M4, the immediately preceding sampled point $P_{i-1}$ is substracted from the present sampled point $P_i$ in step M8. It is then determined in step M9 whether or not $D_i=0$. If YES in step M9, the flow returns to step M3 and the subsequent sampled point is entered in step M2. However, if NO in step M9, the quadrant $\theta_i$ which includes the difference vector $D_i$ is obtained in step M10. Thereafter, the quadrant number difference $\Delta\theta_i$ is calculated in step M11.

Figure 12:
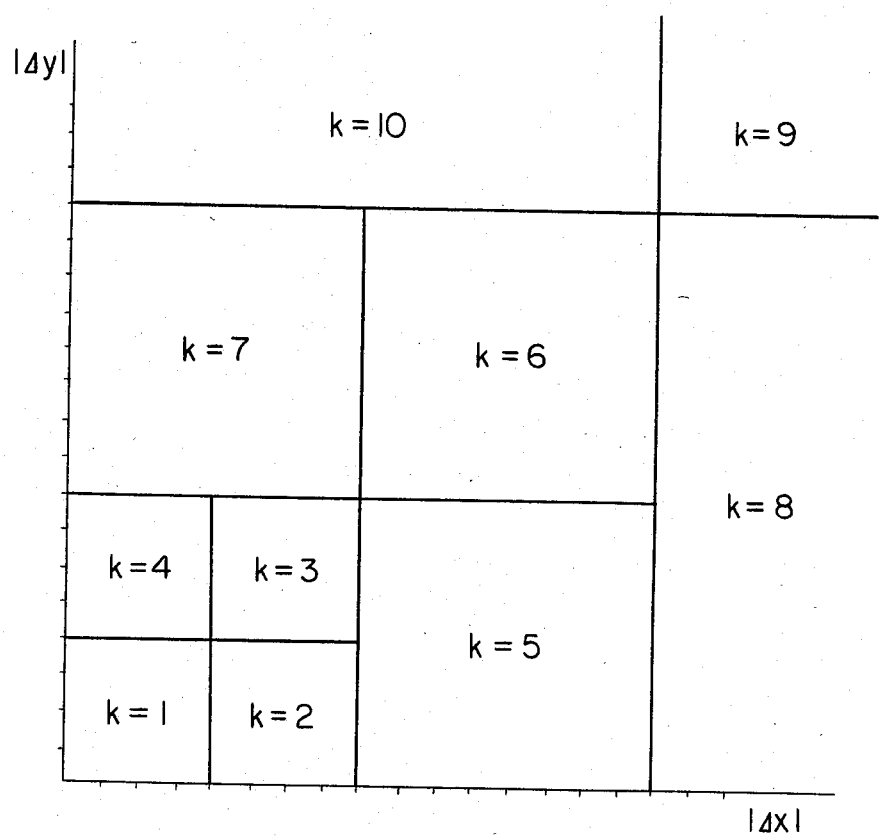
FIG. 12 is a graph for explaining zone division and zone designation number according to the coding algorithm of the second embodiment.

The zone division of the second embodiment slightly differs from that of the first embodiment. Square zones are used in the second embodiment. The width $W^{(k)}$ of the k-th zone (i.e., one side of the square) is given as follows:

$$\begin{aligned}W^{(k)} &= h & \text{for } k = 1 \\ &= h \cdot 2^{[(k-2)/3]} & \text{for } k > 1\end{aligned} \quad (14)$$

where h is the zone width for k=1, [a] is the called the basic zone. The zones are numbered in a counterclockwise order (1, 2, 3, ...) as shown in FIG. 12. The k-th zone is given as follows:

$$\begin{aligned}Z(k) &= \{(|\Delta x|, |\Delta y|); 0 \leq |\Delta x| \leq W^{(k)} - 1, \\ & \quad 0 \leq |\Delta y| \leq W^{(k)} - 1\} \text{ for } k = 1 \\ &= \{(|\Delta x|, |\Delta y|); W^{(k)} \leq |\Delta x| \leq 2W^{(k)} - 1, \\ & \quad 0 \leq |\Delta y| \leq W^{(k)} - 1\} \text{ for } k = 3n - 1 \\ &= \{(|\Delta x|, |\Delta y|); W^{(k)} \leq )|\Delta x| \leq 2W^{(k)} - 1, \\ & \quad W^{(k)} \leq |\Delta y| \leq 2W^{(k)} - 1\} \text{ for } k = 3n \\ &= \{(|\Delta x|, |\Delta y|); 0 \leq |\Delta x| \leq W^{(k)} - 1, \\ & \quad W^{(k)} \leq |\Delta y| \leq 2W^{(k)} - 1\} \text{ for } k = 3n + 1\end{aligned} \quad (15)$$

where $n = 1, 2, 3, 4, \ldots$

The zone number $k_i$ which includes the no-sign difference vector $D_i=(|\Delta x_i|, |\Delta y_i|)$ can be obtained in accordance with equations (14) and (15) when the value h is given as a preset value.

Figure 13:
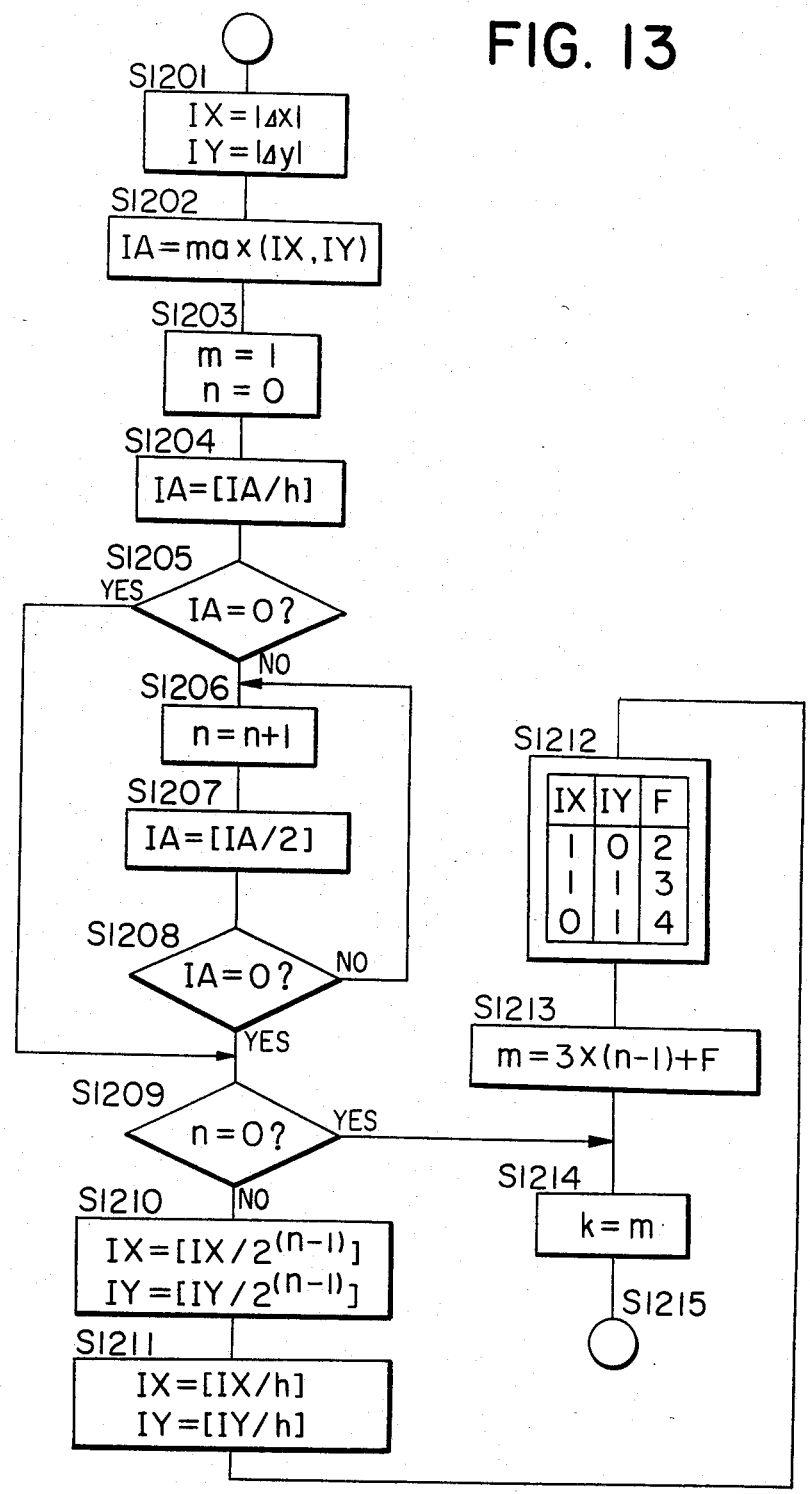
FIG. 13 is a flow chart for explaining an algorithm for obtaining a zone number k.

FIG. 13 is a flow chart for explaining the steps of calculating the zone number $k_1$. This flow chart is the subroutine for step M12 (calculation of the zone number $k_i$) in FIG. 11. The absolute values $|\Delta x|$ and $|\Delta y|$ are present in step S1201. The larger value is selected in step S1202.

Let m as a zone number be 1 (initial value) and a value corresponding to n in equations (15) be zero in step S1203. In step S1204, let IA be [IA/h]. It is then determined in step S1205 whether or not the calculation result [IA/h] in step S1204 becomes zero. If YES in step S1205, it is determined in step S1209 whether or not n=0 at this time. If YES in step S1209, the difference vector falls within the basic zone. Therefore, in step S1214, let k be m=1. However, if NO in step S1205, let n be n+1 in step S1206. The data [IA/2] is calculated in step S1207. It is determined in step S1208 whether or not the obtained data [IA/2] is zero. If NO in step S1208, let n be n+1 in step S1206. It is determined again in step S1208 whether or not the calculated result becomes zero after step S1207. The above operation is repeated unit [IA/2] becomes zero. When [IA/2] becomes zero, n is determined. It is then determined in step S1209 whether or not n is zero. If NO in step S1209, the value of n indicates the zone group number among the groups each having three zones of the same size with respect to a given distance from the basic zone. In other words, a given value of n corresponds to three zones. After n is set, it is determined that the difference vector belong to any one of the three zones in steps S1210 and S1212. More particularly, operations $[IX/2^{n-1}]$ and $[IY/2^{n-1}]$ are performed in step S1210 to assign the x and y components IX and IY of the difference vector in the three zones for n=1. In step S1211, let the updated IX and IY be [IX/h] and [IY/h], respectively. The obtained IX and IY are then set as 1 or 0. In accordance with the combinations of codes 1 and 0, a signal F indicating the specific zone number determined by n for the difference vector is obtained in step S1212. In step S1213, let m be $3 \times (n-1) + F$, thereby determining the zone number k=m.

When the zone number $k_i$ is determined, the zone number difference $\Delta k_i$ is given by the following equation:

$$\Delta k_i = k_i - k_{i-1} \quad (16)$$

It should be noted that $k_0$ is 1 for the sake of simplicity.

A relative pel address $B_i$ indicating the relative position of the difference vector $D_i$ in the zone is obtained by the following equations except for k=1:

$$\begin{aligned}B_i &= (Bx, By) & (17)\\ &= (|\Delta x_i| - W^{(k)}, |\Delta y_i| - W^{(k)}) \\ & \quad \text{for } l = 0 \\ &= (|\Delta x_i|, |\Delta y_i| - W^{(k)}) & (18)\\ & \quad \text{for } l = 1 \\ &= (|\Delta x_i| - W^{(k)}, |\Delta y_i|) & (19)\\ & \quad \text{for } l = 2 \\ \text{where } l &\equiv k \pmod{3} & (20)\end{aligned}$$

Figure 14:
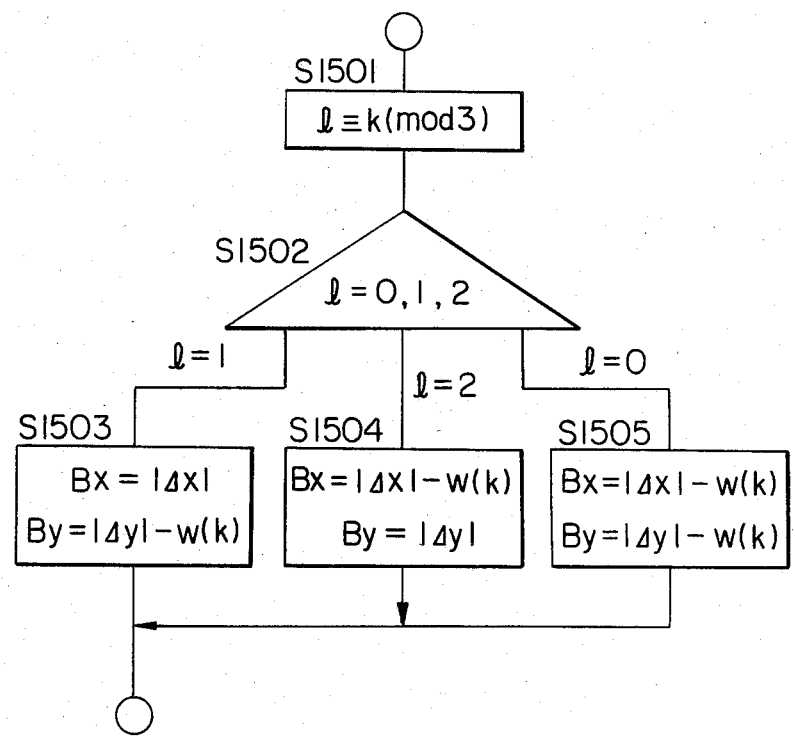
FIG. 14 is a flow chart for explaining an algorithm for obtaining an intrazone relative pel address Bi.

FIG. 14 is a flow chart for explaining the steps of obtaining the relative pel address $B_i$ in the zone in accordance with equations (17) to (20). This flow chart is the subroutine (step M15 for calculation of the relative pel address $B_i$) of the main routine in FIG. 11. l is calculated from the zone number k using equation (20) in step S1501. It is then determined in step S1502 which one of equations (17) to (19) is to be used to calculate the relative pel address $B_i$ in accordance with the obtained l. Components or addresses Bx and By of the relative pel address $B_i$ are calculated in steps S1503 to S1505.

Referring again to FIG. 11, when the above-mentioned coding is performed and the state changes to the pen up state, it indicates the end of one stroke. This change is monitored in step M16. When the pen up state is detected, the code $\theta_{up}$ is produced in step M17.

The sampled point array $\{P_0, P_1, P_2, \ldots, P_f\}$ corresponding to one stroke of the line drawing is expressed using the difference vectors as follows: $\{D_0, D_1, D_2, \ldots, D_f\}$. Each difference vector $D_i$ is expressed by the combination $\{\Delta\theta_i, \Delta k_i, B_i\}$. The pen up code $\theta_{up}$ is added to the final difference vector $D_f$. In order to code these components, a fixed-length code is assigned to the starting point $P_0$ designated as the absolute coordinate point, whereas variable-length codes are assigned to the quadrant number difference $\Delta\theta$ and the zone number difference $\Delta k$.

Table 8 shows code allocation of the quadrant number difference $\Delta\theta$ and the zone number difference $\Delta k$.

TABLE 8

| Symbol | Zone Code Table Value | Code |
|---|---|---|
| $\Delta\theta$ | 0 | 1 |
|  | 1 | 01 |
|  | 2 | 0000 |
|  | 3 | 001 |
| $\theta_{up}$ |  | 0001 |
|  | . |  |
|  | . |  |
|  | . |  |
| $\Delta k$ | −5 | 0000 0000 1 |
|  | −4 | 0000 10 |
|  | −3 | 001 |
|  | −2 | 0110 0 |
|  | −1 | 0001 |
|  | 0 | 1 |
|  | 1 | 0111 |
|  | 2 | 0110 1 |
|  | 3 | 010 |
|  | 4 | 0000 01 |
|  | 5 | 0000 0001 |
|  | . |  |
|  | . |  |

In the above table, the codes are assigned to the quadrant number difference $\Delta\theta$ and the zone number difference $\Delta k$ independently of each other. However, the codes may be assigned to pairs of a quadrant number difference and a zone number difference in Table 9 as follows.

TABLE 9

| No. | $\Delta\theta$ | Zone Code Table $\Delta k$ | Length | Code |
|---|---|---|---|---|
| 0 | pen-lifted | ($\theta_{up}$) | 3 bit | 110 |
| 1 | 0 | 0 | 2 | 01 |
| 2 | 3 | 0 | 4 | 0001 |
| 3 | 1 | 0 | 4 | 1111 |
| 4 | 0 | 3 | 4 | 0010 |
| 5 | 0 | 1 | 4 | 1011 |
| 6 | 0 | −3 | 4 | 1110 |
| 7 | 3 | 3 | 5 | 1001 1 |
| 8 | 0 | −1 | 5 | 0011 1 |
| 9 | 3 | −1 | 6 | 1001 01 |
| 10 | 3 | −3 | 6 | 1000 01 |
| 11 | 2 | 0 | 6 | 0011 01 |
| 12 | 1 | 3 | 6 | 1010 01 |
| 13 | 1 | 1 | 6 | 1000 11 |
| 14 | 1 | −3 | 6 | 1010 11 |
| 15 | 0 | 4 | 6 | 1000 10 |
| 16 | 0 | 2 | 6 | 0000 11 |
| 17 | 0 | −2 | 6 | 0000 01 |
| 18 | 3 | 2 | 7 | 1000 001 |
| 19 | 3 | 1 | 7 | 0000 101 |
| 20 | 3 | 3 | 7 | 1010 100 |
| 21 | 1 | 2 | 7 | 1010 001 |
| 22 | 1 | −1 | 7 | 0011 001 |
| 23 | 1 | −2 | 7 | 1001 000 |
| 24 | 0 | 6 | 7 | 0000 001 |
| 25 | 0 | −4 | 7 | 0011 000 |
| 26 | 0 | −6 | 7 | 1010 000 |
| 27 | 3 | 6 | 8 | 1010 1010 |
| 28 | 2 | 1 | 8 | 1000 0001 |
| 29 | 2 | −1 | 8 | 1001 0010 |
| 30 | 2 | −3 | 8 | 0000 0001 |

The binary codes are assigned to the relative pel addresses $B_i$ in the zone. Since $\{W^{(k)}\}^2$ difference vectors are included in the k-th zone, a required number of bits $R(k)$ for specifying the difference vector in the zone can be given as follows:

$$R(k) = 2\log_2 W^{(k)} \quad (21)$$
$$= 2\log_2 h \text{ for } k = 1$$
$$= 2\log_2 h + 2 \cdot [(k - 2)/3] \text{ for } k > 1$$

where [ ] is the Gaussian integer notation.

As may be apparent from equation (16), when the zone number k is obtained, the minimum number of bits to sepcify the address of the difference vector in the zone is determined by R(k). When the basic zone width h is taken as a power of two, the code bits assigned by R(k) may not be wasted, thereby providing effective coding.

Figures 15, 15A:
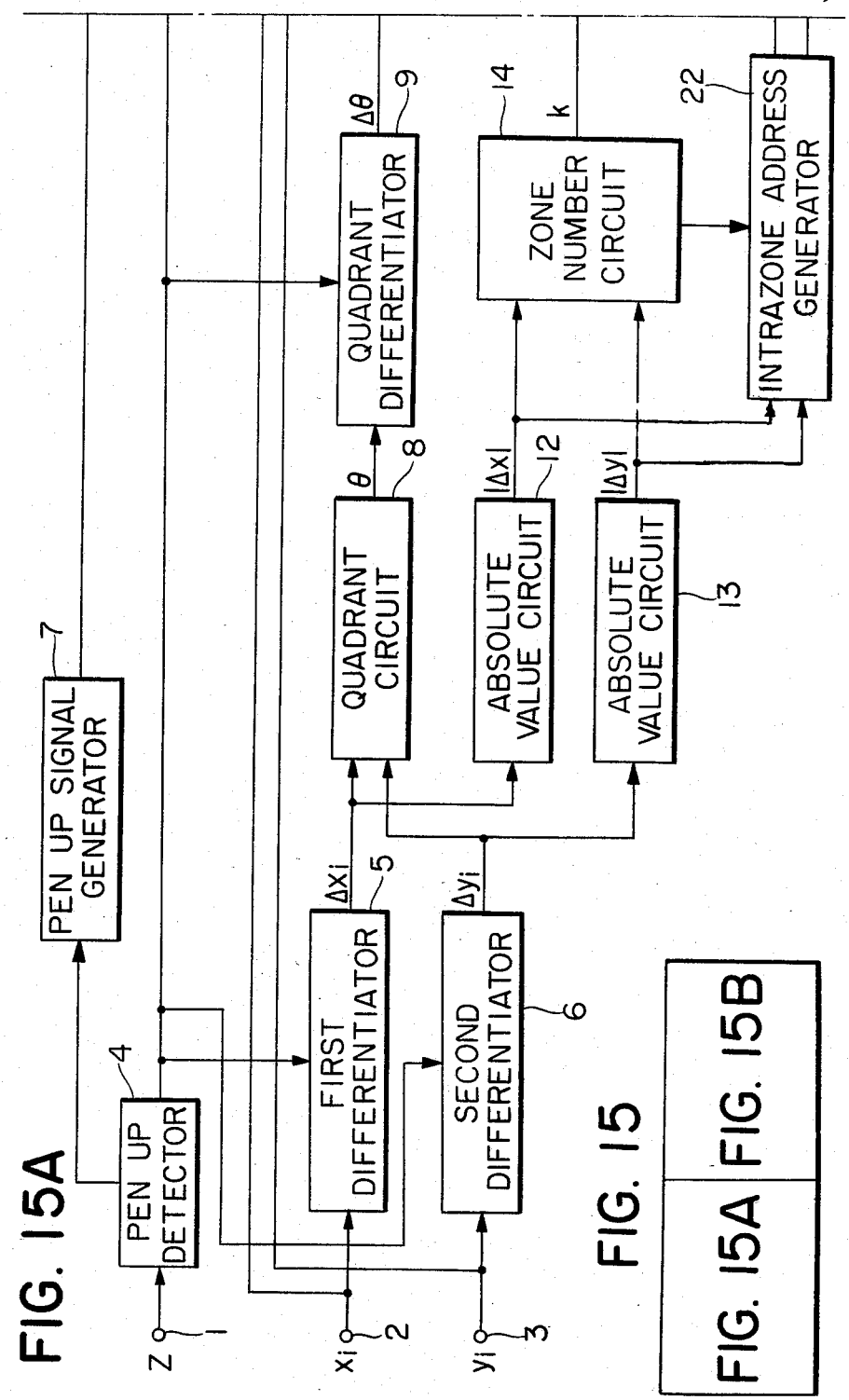
FIGS. 15, 15a and 15b comprise a block diagram of a coding apparatus for executing the coding algorithm of the second embodiment.
Figure 15B:
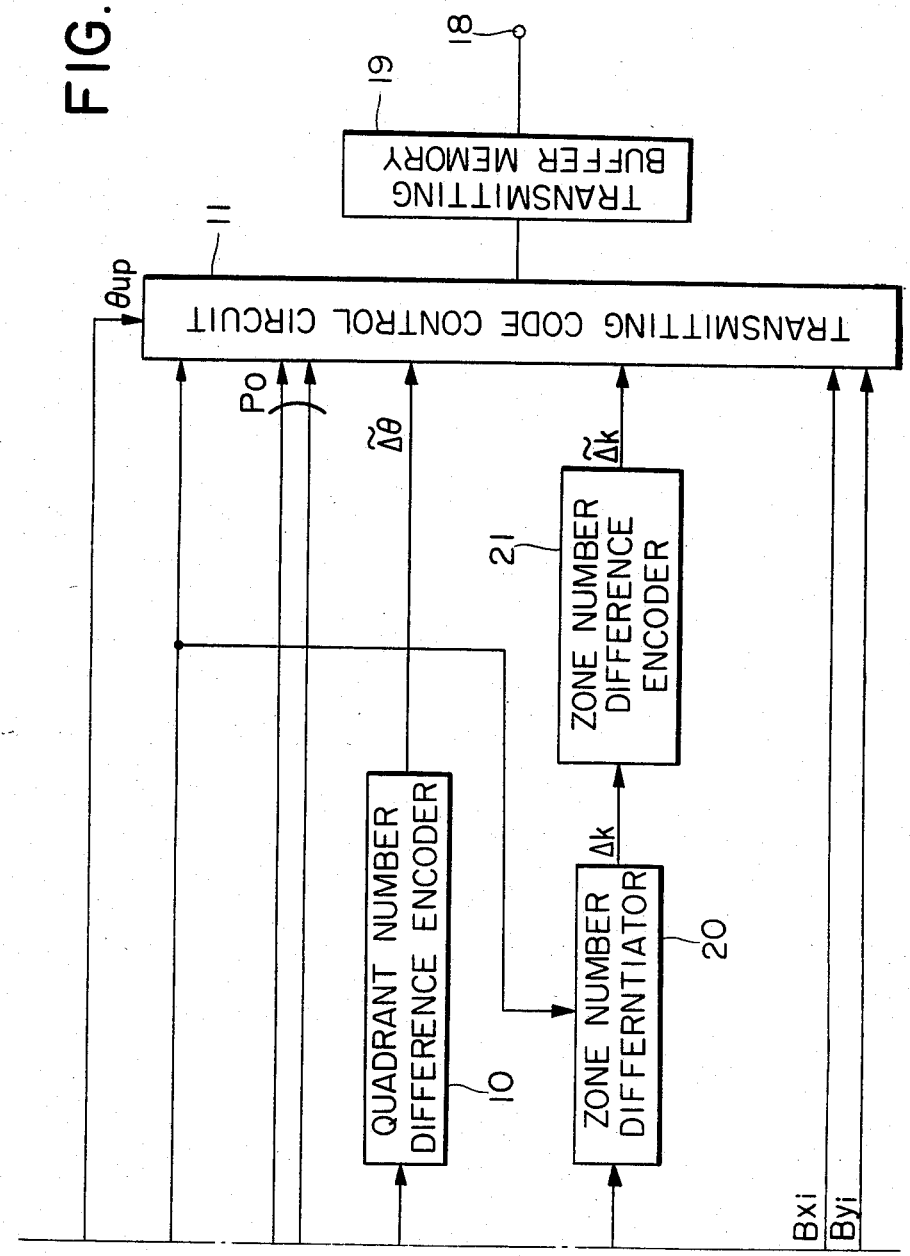

FIG. 15 is a block diagram of a coding apparatus for performing the coding algorithm of the second embodiment. The coding apparatus of the second embodiment is substantially the same as that of the first embodiment, except that in the second embodiment a zone number differentiator 20 and a zone number difference encoder 21 are added, and that an intrazone address generator 22 is arranged in place of the area address circuit 16 and the local address circuit 17 in FIG. 8. The zone number differentiator 20 performs the operation $k_i - k_{i-1}$ so as to obtain the difference $\Delta k_i$. The zone number difference encoder 21 encodes the value of the difference $\Delta k_i$ which is produced by the zone number differentiator 20, in accordance with the allocation of the variable-length codes shown in Table 8. The variable-length code corresponding to the value of the difference $\Delta k_i$ is supplied to the transmitting code control circuit 11. The intrazone address generator 22 generates l from the zone number k from the zone number circuit 14 in accordance with equation (20). Furthermore, the intrazone address or pel address $B_i$ is calculated using whichever one of the equations (17) to (19) is determined by the value of l. The calculated pel address $B_i$ is supplied to the transmitting code control circuit 11. The transmitting code control circuit 11 links the components $P_0$, $\Delta\theta_i$, $\Delta k_i$, $B_i$ and $\theta_{up}$ in a predetermined transmission format. Thus obtained codes are sequentially supplied to the transmitting buffer memory 19.

The transmitted code can be decoded in a reverse manner with respect to the coding process so as to obtain the original coordinate signal.

As described above, the coding/decoding apparatus is not limited to the arrangement in the above embodiment. For example, a microprocessor may be used to perform coding/decoding in a software manner.

In the method and apparatus for coding the sampled points according to the second embodiment, the same advantages as in the first embodiment are obtained. Furthermore, since the zone number difference signal is coded, more effective coding is performed.

The coding efficiency of line drawings shown in FIGS. 16A to 16E of the second embodiment of the present invention is compared with that of the DCE and MDPCM methods. The results are shown in Table 10. As may be apparent from Table 10 below, the efficiency of the coding method of the present invention shows an improvement of about 20% and about 23% respectively as compared with the efficiencies of the DCE and MDPCM methods.

TABLE 10

Figures 16A, 16B, 16C, 16D, 16E:
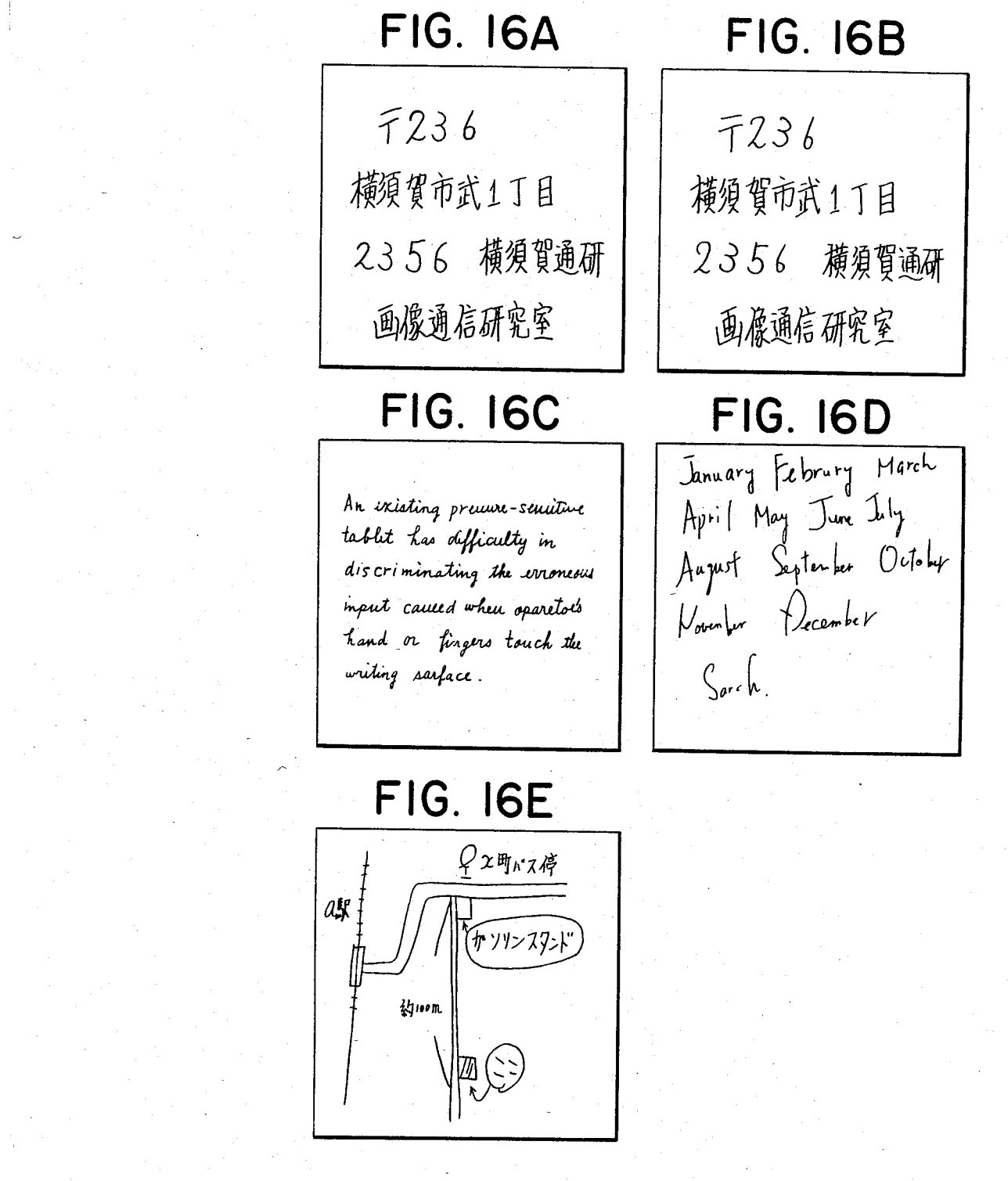

| | Line drawing | | | | |
|---|---|---|---|---|---|
| Coding method | FIG. 16A | FIG. 16B | FIG. 16C | FIG. 16D | FIG. 16E |
| Zone coding | | | | | |

TABLE 10-continued

| Coding method | Line drawing | | | | |
| --- | --- | --- | --- | --- | --- |
| | FIG. 16A | FIG. 16B | FIG. 16C | FIG. 16D | FIG. 16E |
| total bits | 15,877 | 14,048 | 16,256 | 8.072 | 10,018 |
| bit rate (bit/sec) | 128 | 124 | 132 | 257 | 139 |
| ratio to DCE | 0.73 | 0.88 | 0.77 | 0.89 | 0.79 |
| ratio to MDPCM | 0.76 | 0.79 | 0.79 | 0.83 | 0.70 |
| DCE | 21,618 | 15,903 | 21,257 | 9.087 | 12,623 |
| total bits | | | | | |
| bit rate | 188 | 149 | 182 | 310 | 132 |
| MDPCM | 21,005 | 17,624 | 20,559 | 9,753 | 14,282 |
| total bits | | | | | |
| bit rate | 170 | 155 | 167 | 310 | 198 |

What is claimed is:

1. A machine method for coding a line drawing, comprising the steps of:
    inputting a series of coordinate signals indicating the line drawing;
    subtracting every two adjacent coordinate signals among said series of coordinate signals from each other so as to obtain a series of difference vector signals;
    determining to which one of a plurality of predetermined zones each of said series of difference vector signals belongs;
    determining relative pel positions of said series of difference vector signals in the determined zone; and
    coding said determined zone and said relative pel positions within said determined zone independently of each other.

2. A method according to claim 1, wherein said plurality of zones are represented by a plurality of quadrants for classifying a direction component of each difference vector signal and by a plurality of areas solely determined by an absolute value component of the difference vector signal for classifying a magnitude of the difference vector signal.

3. A method according to claim 2, wherein said plurality of quadrants comprise four quadrants obtained by dividing an X-Y coordinate plane by lines y=0 and x=0 when an x-direction component and a y-direction component of the difference vector signal are plotted along the X- and Y-axes, respectively.

4. A method according to claim 2, wherein said plurality of quadrants comprise four quadrants obtained by dividing the X-Y coordinate plane by lines y=x and y=−x when an x-direction component and a y-direction component of the difference vector signal are plotted along the X- and Y-axes, respectively.

5. A method according to claim 2, wherein said plurality of quadrants comprise eight octants obtained by dividing an X-Y coordinate plane by lines x=0, y=0, y=x and y=−x when an x-direction component and a y-direction component of the difference vector signal are plotted along the X- and Y-axes, respectively.

6. A method according to claim 2, wherein said plurality of quadrants are numbered, a sign component of the difference vector signal is used to determine a quadrant number of one of said plurality of quadrants which includes the difference vector signal, and a selected quadrant number is coded.

7. A method according to claim 2, wherein said plurality of quadrants are numbered, a sign component of the difference vector signal is used to determine a quadrant number of one of said plurality of quadrants which includes the difference vector signal, respectively, and a difference between the quadrant numbers of two adjacent different vector signals is coded to form a variable-length quadrant number difference code.

8. A method according to claim 1, wherein said plurality of predetermined zones are set such that a given zone thereof increases in size in accordance with an increase in an absolute value component of each difference vector signal included in the given zone.

9. A method according to claim 2, wherein said plurality of predetermined zones are set such that a width of a given zone thereof increases in proportion to a power of two in accordance with an increase in the absolute value component of the difference vector signal included in the given zone, and wherein said plurality of predetermined zones are numbered and variable-length codes are assigned thereto beforehand.

10. A method according to claim 2, wherein each of said plurality of zones has a square shape a length of one side of which is increased in proportion to a power of two, and each of said plurality of zones has a zone number.

11. A method according to claim 10, wherein the absolute value component of the difference vector signal which excludes a sign component are used to calculate a zone number of a given zone including the difference vector signal, and the zone number is coded to form a variable-length zone number code.

12. A method according to claim 10, wherein the absolute value component of the difference vector signals which excludes a sign component is used to calculate a zone number of a given zone including the difference vector signal, a difference between the zone numbers of two adjacent difference vector signals is obtained, and an obtained zone number difference is coded to form a variable-length zone number difference code.

13. A method according to claim 2, wherein each of said plurality of zones has at least one unit area having a predetermined size, a relative position of the difference vector signal in a first zone among said plurality of zones is designated by an area address assigned to each of said plurality of unit areas and a local address assigned to a relative pel position within the unit area when said first zone has said plurality of unit areas, and a relative position of the difference vector signal in a second zone among said plurality of zones is designated only by the local address when said second zone has only one of said unit areas.

14. A method according to claim 13, wherein
a kth zone Z(k) among said plurality of zones is set to have said unit areas numbering $3 \times (2^{k-1})^2$ each having a side of length h, and a zone number $Z_i$ of the kth zone Z(k) is given as follows:

$$Z_i = [\log_2([\max(|\Delta X_i|, |\Delta Y_i|)/h] + 1)]$$

where $|\Delta x_i|$ and $|\Delta y_i|$ and the x and y absolute value components of the difference vector signal, [a] is the Gaussian integer notation for indicating a maximum integer of not more than a, and [a] is the Gaussian integer notation for indicating a minimum integer of not larger than a,
the area address $A_i$ is designated by a coordinate point $(Ax_i, Ay_i)$ calculated in units of said unit areas along the x- and y-directions so as to define the components $Ax_i$ and $Ay_i$ as follows:

$$Ax_i = [|x_i|/h]$$

$Ay_i = [|Y_i|/h]$, and the local address $L_i$ is designated by a coordinate point ($Lx_i$, $Ly_i$) calculated in units of said relative pel addresses along the x- and y-directions so as to define the components $Lx_i$ and $Ly_i$ as follows:

$$\begin{cases} Lx_i = |\Delta x_i| - Ax_i \times h \\ Ly_i = |\Delta y_i| - Ay_i \times h. \end{cases}$$

15. A method according to claim 14, wherein a zone number of each of said plurality of zones is assigned a variable-length code, the area address is assigned a binary code whose bit length varies in accordance with a size of the zone, and the local address is assigned a fixed-length binary code having a bit length of $[\log_2 h]$.

16. A method according to claim 12, wherein
the side of the square of the kth zone is given as $W^{(k)}$ as follows:

$$W^{(k)} = h \quad \text{for } k = 1 \\ = h \cdot 2^{[k-2/3]} \text{ for } k > 1 \quad \} \quad (a)$$

where h is a width of the zone for k=1 and [ ] is the Gaussian integer notation,
the zone number k is set using inequalities (b) below in accordance with the magnitude of the absolute value component of the difference vector signal:

$$\{0 \leq |\Delta x| \leq W^{(k)} - 1, 0 \leq |\Delta y| \leq W^{(k)} - 1\} \quad (b)$$
for $k = 1$
$$\{W^{(k)} \leq |\Delta x| \leq 2W^{(k)} - 1, 0 \leq |\Delta y| \leq W^{(k)} - 1\}$$
for $k = 3n - 1$
$$\{W^{(k)} \leq |\Delta x| \leq 2W^{(k)} - 1, W^{(k)} \leq |\Delta y| \leq 2W^{(k)} - 1\}$$
for $k = 3n$
$$\{0 \leq |\Delta x| \leq W^{(k)} - 1, W^{(k)} \leq |\Delta y| \leq 2W^{(k)} - 1\}$$
for $k = 3n + 1$ the zone number $k_i$ is calculated from absolute values ($|\Delta x_i|$, $|\Delta y_i|$) of the difference vector signal in accordance with the equations (a) and inequalities (b), the difference $\Delta k_i = k_i - k_{i-1}$ between the zone numbers $k_i$ and $k_{i-1}$ of two adjacent difference vector signals is calculated, and the relative pel address $B_i$ in the zone containing the difference vector signal is calculated by equations (c) and (d) below:

$$B_1 = (Bx, By) \quad (c)$$
$$= (|\Delta x_i| - W^{(k)}, |\Delta y_i| - W^{(k)}) \text{ for } l = 0$$
$$= (|\Delta x_i|, |\Delta y_i| - W^{(k)}) \text{ for } l = 1$$
$$= (|\Delta x_i| - W^{(k)}, |\Delta y_i|) \text{ for } l = 2$$

$$l \equiv k \pmod{3}. \quad (d)$$

17. An apparatus for coding a line drawing, comprising:
an input terminal for receiving a series of coordinate signals indicating the line drawing;
a differentiator for subtracting every two adjacent coordinate signals among said series of coordinate signals from each other so as to produce a series of difference vector signals;
a quadrant circuit for determining a quadrant number of a quadrant of each of said series of difference vector signals;
a quadrant differentiator for subtracting the quadrant numbers of the two adjacent difference vector signals from each other so as to produce a series of quadrant number difference signals;
a zone circuit for sequentially determining a plurality of zones which include said series of difference vector signals in accordance with absolute values thereof;
an area address circuit for sequentially determining unit areas which include said series of difference vector signals, said unit areas constituting said plurality of zones;
a local address circuit for sequentially determining relative pel addresses which correspond to said series of difference vector signals; and
an encoder for encoding the quadrant number difference signal, a zone number signal, an area address indicating the unit area corresponding thereto, and a local address indicating the relative pel address corresponding thereto.

18. An apparatus for coding a line drawing, comprising:
an input terminal for receiving a series of coordinate signals indicating the line drawing;
a differentiator for subtracting every two adjacent coordinate signals among said series of coordinate signals from each other so as to produce a series of difference vector signals;
a quadrant circuit for determining a quadrant number of a quadrant of each of said series of difference vector signals;
a quadrant differentiator for subtracting the quadrant numbers of the two adjacent difference vector signals from each other so as to produce a series of quadrant number difference signals;
a zone circuit for sequentially determining a plurality of zones which include said series of difference vector signals in accordance with absolute values thereof;
a zone number differentiator for calculating a difference between the zone numbers of said zones which include the two adjacent difference vector signals so as to obtain a series of zone number difference signal;
a circuit for generating relative addresses of the difference vector signals in the zone; and
an encoder for encoding the quadrant number difference signal, the zone number difference signal and the relative address in the zone.

* * * * *